US011153866B2

(12) United States Patent
Farajidana et al.

(10) Patent No.: US 11,153,866 B2
(45) Date of Patent: Oct. 19, 2021

(54) SHORTENED TRANSMISSION TIME INTERVAL CONFIGURATION BASED ON USER EQUIPMENT CAPABILITIES

(71) Applicant: QUALCOMM Incorporated, San Diego, CA (US)

(72) Inventors: Amir Farajidana, Sunnyvale, CA (US); Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 15/970,139

(22) Filed: May 3, 2018

(65) Prior Publication Data

US 2018/0324778 A1 Nov. 8, 2018

Related U.S. Application Data

(60) Provisional application No. 62/502,563, filed on May 5, 2017.

(51) Int. Cl.
*H04W 72/04* (2009.01)
*H04W 72/12* (2009.01)
(Continued)

(52) U.S. Cl.
CPC .......... *H04W 72/044* (2013.01); *H04L 5/001* (2013.01); *H04L 5/0082* (2013.01);
(Continued)

(58) Field of Classification Search
CPC ............. H04W 72/044; H04W 72/042; H04W 72/0446; H04W 72/1273; H04W 72/048;
(Continued)

(56) References Cited

U.S. PATENT DOCUMENTS 9,906,946 B2 2/2018 Yamada et al.
10,694,516 B2 * 6/2020 Takeda .............. H04W 72/0446
(Continued)

FOREIGN PATENT DOCUMENTS

CN 107371265 A 11/2017
EP 3280086 A1 2/2018
(Continued)

OTHER PUBLICATIONS

International Search Report and Written Opinion—PCT/US2018/031175—ISA/EPO—dated Jul. 31, 2018.
(Continued)

*Primary Examiner* — Thomas R Cairns
(74) *Attorney, Agent, or Firm* — Holland & Hart LLP

(57) ABSTRACT

Methods, systems, and devices for wireless communication are described for shortened transmission time interval (TTI) configuration based on user equipment (UE) capabilities. A UE may determine, for each of one or more supported bands or band combinations, a capability of the UE to process transmissions having a first transmission time interval (TTI) duration and a second TTI duration, the first TTI duration being shorter than the second TTI duration. The UE may transmit to a base station an indicator representing the capability for the each of the one or more supported bands or band combinations. The base station may receive the indicator, schedule a component carrier within a frequency band of a first supported band combination of the one or more supported band combinations based at least in part on the received indicator, and transmit information within the frequency band of the component carrier based on the scheduling.

65 Claims, 17 Drawing Sheets

(51) Int. Cl.
*H04L 5/00* (2006.01)
*H04L 5/14* (2006.01)

(52) U.S. Cl.
CPC ......... *H04L 5/0092* (2013.01); *H04W 72/042* (2013.01); *H04W 72/0446* (2013.01); *H04W 72/1273* (2013.01); *H04L 5/0023* (2013.01); *H04L 5/0048* (2013.01); *H04L 5/0055* (2013.01); *H04L 5/0064* (2013.01); *H04L 5/14* (2013.01); *H04W 72/048* (2013.01)

(58) Field of Classification Search
CPC . H04W 8/22; H04W 16/28; H04W 16/52834; H04W 72/0453–0473; H04L 5/001; H04L 5/0082; H04L 5/0092; H04L 5/0023; H04L 5/0048; H04L 5/0055; H04L 5/0064; H04L 5/14; H04L 1/0001; H04L 5/0001; H04L 5/0005; H04L 5/0007; H04L 5/0025; H04L 5/005–0051; H04L 5/008; H04L 5/0083; H04L 5/0085; H04L 5/1407–18; H04L 5/1469; H04L 25/22; H04L 27/2611; H04B 3/20; H04B 3/40; H04B 7/0413; H04B 7/0697; H04J 11/00; H04J 13/00; H04Q 3/00
See application file for complete search history.

(56) References Cited

U.S. PATENT DOCUMENTS

| | | | |
|---|---|---|---|
| 2016/0100395 A1* | 4/2016 | Xu | H04W 72/1231 370/336 |
| 2017/0250844 A1 | 8/2017 | Wu et al. | |
| 2017/0290008 A1* | 10/2017 | Tooher | H04L 1/0007 |
| 2018/0367282 A1* | 12/2018 | Li | H04L 1/1896 |
| 2019/0174492 A1* | 6/2019 | Gao | H04W 72/02 |

FOREIGN PATENT DOCUMENTS

| | | |
|---|---|---|
| EP | 3457641 A1 | 3/2019 |
| WO | WO-2016040290 A1 | 3/2016 |
| WO | WO2017053637 A1 | 3/2017 |

OTHER PUBLICATIONS

Nokia et al: "sTTI Configurability for Carrier Aggregation", 3GPP Draft; R1-1704795, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Mar. 24, 2017 (Mar. 24, 2017), XP051250557, pp. 1-3, Retrieved from the Internet: URL:http://www.3gpp.org/ftp/tsg_ran/WG1_RL1/TSGR1_88b/Docs/ [retrieved on Mar. 24, 2017].

Qualcomm et al: "WF on Dynamic Scheduling of PDSCH and sPDSCH," 3GPP Draft R1-1706602; WF on Dynamic Scheduling of PDSCH and sPDSCH, 3rd Generation Partnership Project (3GPP), Mobile Competence Centre; 650, Route Des Lucioles; F-06921, Sophia-Antipolis Cedex, France, vol. RAN WG1, No. Spokane, USA; Apr. 3, 2017-Apr. 7, 2017, Apr. 9, 2017 (Apr. 9, 2017), XP051253070, 5 pages, Retrieved from the Internet: URL:http://www.3gpp.org/ftp/tsg_ran/WG1_RL1/TSGR1_88b/Docs/ [retrieved on Apr. 9, 2017].

Qualcomm Incorporated: "Design Details of the Shortened PDSCH," 3GPP Draft; R1-1704992, Design Details of the Shortened PDSCH, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Mar. 25, 2017 (Mar. 25, 2017), XP051251667, 6 pages, Retrieved from the Internet: URL:http://www.3gpp.org/ftp/tsg_ran/WG1_RL1/TSGR1_88b/Docs/ [retrieved on Mar. 25, 2017].

Qualcomm, et al., "WF on Dynamic Scheduling of PDSCH and sPDSCH", 3GPP TSG-RAN WG1 Meeting #88bis, 3GPP, R1-1706358, Spokane, USA, 5 Pages, Apr. 3-7, 2017, pp. 2 to 5.

Taiwan Search Report—TW107115228—TIPO—Aug. 6, 2021.

* cited by examiner

SHORTENED TRANSMISSION TIME INTERVAL CONFIGURATION BASED ON USER EQUIPMENT CAPABILITIES

CROSS REFERENCES

The present application for patent claims benefit of U.S. Provisional Patent Application No. 62/502,563 by Farajidana, et al., entitled "SHORTENED TRANSMISSION TIME INTERVAL CONFIGURATION BASED ON USER EQUIPMENT CAPABILITIES," filed May 5, 2017, assigned to the assignee hereof, and expressly incorporated herein by reference in its entirety.

BACKGROUND

The following relates generally to wireless communication, and more specifically to a shortened transmission time interval configuration based on user equipment capabilities.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station in some Long Term Evolution (LTE) or New Radio (NR) deployments may transmit to one or more UEs using different length transmission time intervals (TTIs) that may be reduced in length relative to legacy LTE TTIs. Such a reduced length TTI may be referred to as a shortened TTI (sTTI) and may support services that provide low latency with high reliability for wireless transmissions. A base station may allocate transmission resources for sTTIs to a UE that may include time resources and frequency resources. In some cases, reliability for low latency services may be enhanced through feedback mechanisms that may provide for retransmission of unsuccessfully received transmissions, such as according to hybrid acknowledgment repeat request (HARQ) feedback techniques, for example. Efficient allocation of sTTI resources and efficient HARQ feedback may help to increase the efficiency and reliability of a wireless communications system.

SUMMARY

The described techniques relate to improved methods, systems, devices, or apparatuses that support shortened transmission time interval (sTTI) configuration based on user equipment (UE) capabilities. The techniques provide efficient resource allocation and reliable HARQ feedback by having a UE indicate to a base station its capability to process sTTIs and/or TTIs in each carrier aggregation (CA) band, band combination, or band of a band combination, supported by the UE. The indication may indicate whether the UE can process sTTIs, process sTTIs but with constraints, process both sTTIs and TTIs separately or simultaneously, decode sTTIs and TTIs, and transmit a HARQ ACK/NACK for the sTTI and TTIs within time frames for providing feedback to respectively meet the low and normal latency specifications, or the like.

The UE may generate an indicator representing its capability to process transmissions having a sTTI duration and a TTI duration for each of the one or more supported bands, band combinations, or bands in a band combination. A base station may use the indicator to configure and schedule component carriers for the UE. In an example, a UE may determine, for each of one or more supported bands or band combinations, a capability of the UE to process transmissions having a first TTI duration and a second TTI duration, the first TTI duration being shorter than the second TTI duration. The UE may generate an indicator representing the capability for the each of the one or more supported bands or band combinations and transmit the indicator to a base station. The base station may receive the indicator, schedule a component carrier within a frequency band of a first supported band or band combination of the one or more supported bands or band combinations based at least in part on the received indicator, and transmit information within the frequency band of the component carrier based on the scheduling.

A method of wireless communication is described. The method may include determining, for each of one or more supported bands or band combinations, a capability of the UE to process transmissions having a first TTI duration and a second TTI duration, the first TTI duration being shorter than the second TTI duration, and transmitting, to a base station, an indicator representing the capability for the each of the one or more supported bands or band combinations.

An apparatus for wireless communication is described. The apparatus may include means for determining, for each of one or more supported bands or band combinations, a capability of the UE to process transmissions having a first TTI duration and a second TTI duration, the first TTI duration being shorter than the second TTI duration, means for transmitting, to a base station, an indicator representing the capability for the each of the one or more supported bands or band combinations.

Another apparatus for wireless communication is described. The apparatus may include a processor, memory in electronic communication with the processor, and instructions stored in the memory. The instructions may be operable to cause the processor to determine, for each of one or more supported bands or band combinations, a capability of the UE to process transmissions having a first TTI duration and a second TTI duration, the first TTI duration being shorter than the second TTI duration, transmit, to a base station, an indicator representing the capability for the each of the one or more supported bands or band combinations.

A non-transitory computer readable medium for wireless communication is described. The non-transitory computer-readable medium may include instructions operable to cause a processor to determine, for each of one or more supported bands or band combinations, a capability of the UE to process transmissions having a first TTI duration and a second TTI duration, the first TTI duration being shorter than the second TTI duration, transmit, to a base station, an indicator representing the capability for the each of the one or more supported bands or band combinations.

In some examples of the method, apparatus, and non-transitory computer-readable medium described above, the process, feature, means, or instructions for transmitting an indicator representing the capability for the each of the one or more supported bands or band combinations may further include processes, features, means, or instructions for transmitting a capability of the UE to process transmission having a third TTI duration that differs from one or both of the first TTI duration and the second duration.

In some examples of the method, apparatus, and non-transitory computer-readable medium described above, the process, feature, means, or instructions for transmitting an indicator representing the capability for the each of the one or more supported bands or band combinations may further include processes, features, means, or instructions for transmitting an uplink indicator that indicates an uplink capability of the UE to support uplink transmissions having the first TTI duration or the second TTI duration.

In some examples of the method, apparatus, and non-transitory computer-readable medium described above, the uplink indicator indicates a defined number of uplink component carriers supported by the UE for uplink transmissions having the first TTI duration or the second TTI duration.

In some examples of the method, apparatus, and non-transitory computer-readable medium described above, the process, feature, means, or instructions for transmitting an indicator representing the capability for the each of the one or more supported bands or band combinations may further include processes, features, means, or instructions for transmitting a downlink indicator that indicates a downlink capability of the UE to support downlink transmissions having the first TTI duration or the second TTI duration.

In some examples of the method, apparatus, and non-transitory computer-readable medium described above, the downlink indicator may indicate a defined number of downlink component carriers supported by the UE for downlink transmissions having the first TTI duration or the second TTI duration.

In some examples of the method, apparatus, and non-transitory computer-readable medium described above, the indicator may indicate an uplink capability of the UE to support uplink transmissions having the first TTI duration or the second TTI duration and a downlink capability of the UE to support downlink transmissions having the first TTI duration or the second TTI duration. In some examples of the method, apparatus, and non-transitory computer-readable medium described above, the uplink capability differs from the downlink capability.

In some examples of the method, apparatus, and non-transitory computer-readable medium described above, the process, feature, means, or instructions for transmitting an indicator representing the capability for the each of the one or more supported bands or band combinations may further include processes, features, means, or instructions for receiving, based at least in part on the indicator, a configuration message indicating a first number of component carriers in a first supported band or band combination of the one or more supported bands or band combinations. In some examples of the method, apparatus, and non-transitory computer-readable medium described above, the first number may exceed a defined number of component carriers supported by the UE for uplink or downlink transmissions having the first TTI duration.

In some examples of the method, apparatus, and non-transitory computer-readable medium described above, the indicator may indicate the capability of the UE to process transmissions having the first TTI duration or the second TTI duration in at least one band of a first band combination of the one or more supported bands or band combinations.

In some examples of the method, apparatus, and non-transitory computer-readable medium described above, the indicator may indicate a capability of the UE to support transmissions having the first TTI duration and the second TTI duration on the each band while the UE operates in the each of the one or more supported bands or band combinations.

In some examples of the method, apparatus, and non-transitory computer-readable medium described above, the indication may indicate a constraint on the capability when the UE operates in the each of the one or more supported bands or band combinations. In some examples of the method, apparatus, and non-transitory computer-readable medium described above, the constraint may be a processing constraint of the UE for each band of the one or more supported bands or band combinations. In some examples of the method, apparatus, and non-transitory computer-readable medium described above, the processing constraint is a discard window depth. In some examples of the method, apparatus, and non-transitory computer-readable medium described above, the first TTI duration is one or more symbols or slots. In some examples of the method, apparatus, and non-transitory computer-readable medium described above, the processing constraint is associated with Enhanced Physical Downlink Control Channel (ePDCCH) based scheduling, or DeModulation Reference Signal (DMRS) based transmission modes (TMs), or both.

Some examples of the method, apparatus, and non-transitory computer-readable medium described above may further include processes, features, means, or instructions for determining that the UE is capable of simultaneously processing transmissions in the first TTI duration and the second TTI duration while operating in the each of the one or more supported bands or band combinations, wherein the indicator represents that the UE is capable of simultaneously processing transmissions in accordance with a first timeline for the first TTI duration and in accordance with a second timeline for the second TTI duration. In some examples, the first timeline and the second timeline may be the same or may differ. In some examples of the method, apparatus, and non-transitory computer-readable medium described above, the process, feature, means, or instructions for transmitting an indicator representing the capability for the each of the one or more supported bands or band combinations may further include processes, features, means, or instructions for determining that the UE is capable of simultaneously processing transmissions in a third TTI duration that differs from one or both of the first TTI duration and the second TTI duration while operating in each band of the one or more supported bands or band combinations, wherein the indicator represents that the UE is capable of simultaneously processing transmissions in accordance with a third timeline for the third TTI duration.

Some examples of the method, apparatus, and non-transitory computer-readable medium described above may further include processes, features, means, or instructions for determining a number of spatial layers that the UE may be capable of supporting per component carrier or per band in the each of the one or more supported bands or band combinations, wherein the indicator may be generated based at least in part on the determined number of spatial layers.

Some examples of the method, apparatus, and non-transitory computer-readable medium described above may further include processes, features, means, or instructions for determining that the UE may be capable of supporting a first number of spatial layers per component carrier or per band in a first supported band or band combination of the one or more supported bands or band combinations, wherein the indicator indicates that the UE may be capable of supporting a second number of spatial layers that may be less than the first number of spatial layers in the first supported band or band combination.

Some examples of the method, apparatus, and non-transitory computer-readable medium described above may further include processes, features, means, or instructions for processing first information of the first TTI duration and second information of the second TTI duration in accordance with the capability. In some examples of the method, apparatus, and non-transitory computer-readable medium described above, transmitting the indicator comprises: determining a discard window depth to identify a depth at which the UE discards the second information received in one or more instances of the second TTI duration prior to the first TTI duration, wherein the indicator indicates the discard window depth.

In some examples of the method, apparatus, and non-transitory computer-readable medium described above, the process, feature, means, or instructions for transmitting an indicator representing the capability for the each of the one or more supported bands or band combinations may further include processes, features, means, or instructions for determining an uplink discard window depth for uplink transmissions and a downlink discard window depth for downlink transmissions. In some examples of the method, apparatus, and non-transitory computer-readable medium described above, the process, feature, means, or instructions for determining an uplink discard window depth for uplink transmissions and a downlink discard window depth for downlink transmissions may further include processes, features, means, or instructions for determining an uplink discard window depth in accordance with a first timeline, and determining a downlink discard window depth in accordance with a second timeline.

Some examples of the method, apparatus, and non-transitory computer-readable medium described above may further include processes, features, means, or instructions for determining a sum of a maximum transport block size (TBS) and/or number of resource blocks of the second information within a processing window and a TBS and/or number of resource blocks of the first information within the processing window. Some examples of the method, apparatus, and non-transitory computer-readable medium described above may further include processes, features, means, or instructions for comparing the sum to a threshold.

In some examples of the method, apparatus, and non-transitory computer-readable medium described above, comparing the sum to the threshold comprises: determining that the sum does not satisfy the threshold. Some examples of the method, apparatus, and non-transitory computer-readable medium described above may further include processes, features, means, or instructions for discarding at least some of the second information received in the one or more instances of the second TTI duration.

In some examples of the method, apparatus, and non-transitory computer-readable medium described above, comparing the sum to the threshold comprises: determining that the sum satisfies the threshold. Some examples of the method, apparatus, and non-transitory computer-readable medium described above may further include processes, features, means, or instructions for processing the first information and the second information received in the one or more instances of the second TTI duration.

In some examples of the method, apparatus, and non-transitory computer-readable medium described above, the indicator indicates that the UE may be capable of simultaneously processing the first TTI duration and the second TTI duration in a first supported band or band combination of the one or more supported bands or band combinations. In some examples of the method, apparatus, and non-transitory computer-readable medium described above, the indicator indicates that the UE may be not capable of processing the first TTI duration in a first supported band or band combination of the one or more supported bands or band combinations.

In some examples of the method, apparatus, and non-transitory computer-readable medium described above, the indicator indicates a capability of the UE to process the first TTI duration in each of the one or more supported bands or band combinations. In some examples of the method, apparatus, and non-transitory computer-readable medium described above, the indicator comprises an uplink indicator that indicates a capability of the UE to process an uplink instance of the first TTI duration in a first supported band or band combination of the one or more supported bands or band combinations and a downlink indicator that indicates a capability of the UE to process a downlink instance of the first TTI duration in the first supported band or band combination.

In some examples of the method, apparatus, and non-transitory computer-readable medium described above, the indicator indicates a capability of the UE to process a first instance of the first TTI duration having a first length in a first supported band or band combination of the one or more supported bands or band combinations and a capability of the UE to process a second instance of the first TTI duration having a second length in the first supported band or band combination.

Some examples of the method, apparatus, and non-transitory computer-readable medium described above may further include processes, features, means, or instructions for receiving, based at least in part on the indicator, a configuration message that configures the UE with a first number of component carriers (CCs) in a first supported band or band combination of the one or more supported bands or band combinations that exceeds a second number of CCs that the UE may be capable of supporting.

Some examples of the method, apparatus, and non-transitory computer-readable medium described above may further include processes, features, means, or instructions for determining that the base station may have scheduled a third number of CCs for the UE that exceeds the second number of CCs. Some examples of the method, apparatus, and non-transitory computer-readable medium described above may further include processes, features, means, or instructions for dropping one or both of first information of the first TTI duration or second information of the second TTI duration transported in one or more of the scheduled third number of CCs. Some examples of the method, apparatus, and non-transitory computer-readable medium described above may further include processes, features, means, or instructions for transmitting a negative acknowledgment for the dropped one or both of the first information or the second information.

Some examples of the method, apparatus, and non-transitory computer-readable medium described above may further include processes, features, means, or instructions for determining that processing durations of the first information and the second information may be overlapping. Some examples of the method, apparatus, and non-transitory computer-readable medium described above may further include processes, features, means, or instructions for transmitting a first acknowledgement message for the first information based at least in part on an acknowledgement timeline for the first TTI duration and a second acknowledgement message for the second information based at least in part on an acknowledgement timeline for the second TTI duration.

In some examples of the method, apparatus, and non-transitory computer-readable medium described above, transmitting the indicator comprises: determining a relationship between a number of CCs that the UE supports for the first TTI duration and the second TTI duration, wherein the indicator indicates the relationship.

In some examples of the method, apparatus, and non-transitory computer-readable medium described above, the indicator indicates support for Enhanced Physical Downlink Control Channel (ePDCCH) based scheduling for a first supported band or band combination of the one or more supported bands or band combinations.

In some examples of the method, apparatus, and non-transitory computer-readable medium described above, the indicator indicates support for DeModulation Reference Signal (DMRS) based transmission modes (TMs) for a first supported band or band combination of the one or more supported bands or band combinations.

In some examples of the method, apparatus, and non-transitory computer-readable medium described above, the each of one or more supported bands or band combinations may be carrier aggregation band combinations.

A method of wireless communication is described. The method may include receiving an indicator representing a capability of the UE to process transmissions having a first TTI duration and a second TTI duration for each of one or more supported bands or band combinations, the first TTI duration being shorter than the second TTI duration, scheduling a component carrier within a frequency band of a first supported band or band combination of the one or more supported bands or band combinations based at least in part on the received indicator, and transmitting information within the frequency band of the component carrier based at least in part on the scheduling.

An apparatus for wireless communication is described. The apparatus may include means for receiving an indicator representing a capability of the UE to process transmissions having a first TTI duration and a second TTI duration for each of one or more supported bands or band combinations, the first TTI duration being shorter than the second TTI duration, means for scheduling a component carrier within a frequency band of a first supported band or band combination of the one or more supported bands or band combinations based at least in part on the received indicator, and means for transmitting information within the frequency band of the component carrier based at least in part on the scheduling.

Another apparatus for wireless communication is described. The apparatus may include a processor, memory in electronic communication with the processor, and instructions stored in the memory. The instructions may be operable to cause the processor to receive an indicator representing a capability of the UE to process transmissions having a first TTI duration and a second TTI duration for each of one or more supported bands or band combinations, the first TTI duration being shorter than the second TTI duration, schedule a component carrier within a frequency band of a first supported band or band combination of the one or more supported bands or band combinations based at least in part on the received indicator, and transmit information within the frequency band of the component carrier based at least in part on the scheduling.

A non-transitory computer readable medium for wireless communication is described. The non-transitory computer-readable medium may include instructions operable to cause a processor to receive an indicator representing a capability of the UE to process transmissions having a first TTI duration and a second TTI duration for each of one or more supported bands or band combinations, the first TTI duration being shorter than the second TTI duration, schedule a component carrier within a frequency band of a first supported band or band combination of the one or more supported bands or band combinations based at least in part on the received indicator, and transmit information within the frequency band of the component carrier based at least in part on the scheduling.

In some examples of the method, apparatus, and non-transitory computer-readable medium described above, the process, feature, means, or instructions for receiving an indicator representing the capability for the each of the one or more supported bands or band combinations may further include processes, features, means, or instructions for receiving an uplink indicator that indicates a defined number of uplink component carriers supported by the UE for uplink transmissions having the first TTI duration, and receiving a downlink indicator that indicates a defined number of downlink component carriers supported by the UE for downlink transmissions having the first TTI duration.

In some examples of the method, apparatus, and non-transitory computer-readable medium described above, the indicator indicates a capability of the UE to support transmissions having the first TTI duration and the second TTI duration on the each band while the UE operates in the each of the one or more supported bands or band combinations.

In some examples of the method, apparatus, and non-transitory computer-readable medium described above, the uplink indicator indicates a defined number of uplink component carriers supported by the UE for the uplink transmissions having the first TTI duration, and wherein the downlink indicator indicates a defined number of downlink component carriers supported by the UE for the downlink transmissions having the first TTI duration.

Some examples of the method, apparatus, and non-transitory computer-readable medium described above may further include processes, features, means, or instructions for transmitting, based at least in part on the indicator, a configuration message indicating a first number of component carriers in a first supported band or band combination of the one or more supported bands or band combinations, the first number exceeding the defined number of uplink component carriers for the uplink transmissions having the first TTI duration or the defined number of downlink component carriers for the downlink transmissions having the first TTI duration.

Some examples of the method, apparatus, and non-transitory computer-readable medium described above may further include processes, features, means, or instructions for processing the indicator to determine a first number of CCs within the frequency band that the UE may be configured to support. Some examples of the method, apparatus, and non-transitory computer-readable medium described above may further include processes, features, means, or instructions for configuring the UE with a second number of CCs, wherein the second number of CCs exceeds a maximum number of CCs specified in the indicator that the UE may be configured to support.

Some examples of the method, apparatus, and non-transitory computer-readable medium described above may further include processes, features, means, or instructions for scheduling a second number of CCs for the UE within the frequency band, wherein the second number of CCs exceeds the first number of CCs. Some examples of the method, apparatus, and non-transitory computer-readable medium described above may further include processes, features, means, or instructions for processing the indicator to determine a relationship between a number of component carriers that the UE supports for the first TTI duration and the second TTI duration, wherein scheduling the component carrier may be based at least in part on the relationship.

In some examples of the method, apparatus, and non-transitory computer-readable medium described above, transmitting the information within the frequency band of the component carrier comprises: transmitting first information in the first TTI duration and second information in the second TTI duration. Some examples of the method, apparatus, and non-transitory computer-readable medium described above may further include processes, features, means, or instructions for receiving a first acknowledgement message for the first information based at least in part on an acknowledgement timeline for the first TTI duration and a second acknowledgement message for the second information based at least in part on an acknowledgement timeline for the second TTI duration.

DETAILED DESCRIPTION

Figure 1:
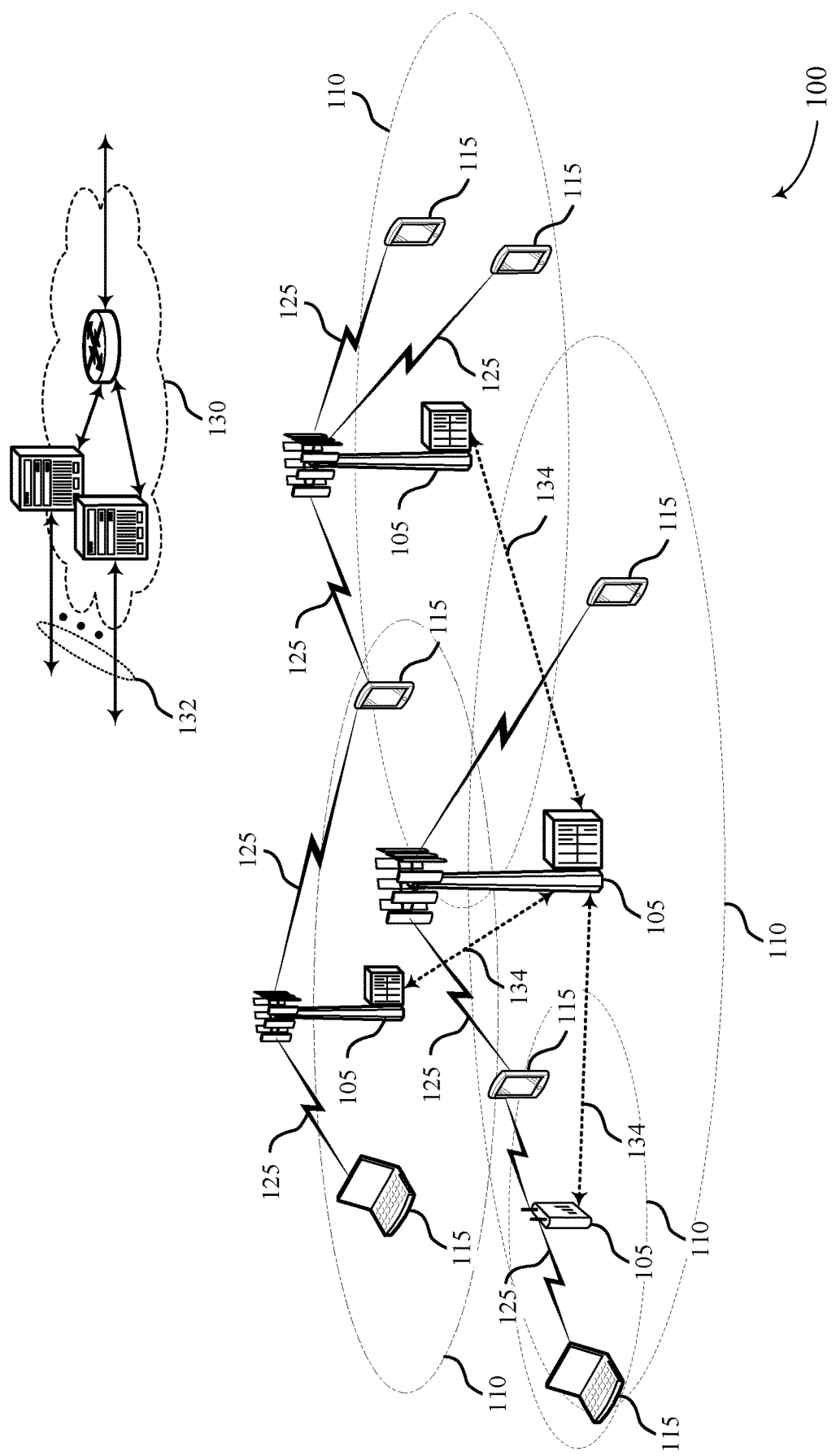
FIG. 1 illustrates an example of a system for wireless communication that supports shortened transmission time interval configuration based on user equipment capabilities in accordance with aspects of the present disclosure.

The described techniques relate to improved methods, systems, devices, or apparatuses that support shortened transmission time interval (sTTI) configuration based on user equipment capabilities. The techniques provide efficient allocation of resources and reliable HARQ feedback by having a user equipment (UE) indicate to a base station a capability of the UE to process sTTIs and/or TTIs in each carrier aggregation (CA) band, band combination, or band of a band combination supported by the UE. The described techniques provide for a UE to determine its capability for sTTI operations and generate an indicator (e.g., a capability report) representing a capability of the UE to process transmissions having a sTTI duration and a TTI duration for each of one or more supported bands, band combinations, or bands of a band combination. The capability may include whether the UE can process sTTIs, process sTTIs but with constraints, process both sTTIs and TTIs separately or simultaneously, decode sTTIs and TTIs, and transmit a HARQ ACK/NACK for the sTTI and TTIs within time frames for providing feedback to respectively meet the low and normal latency specifications.

The base station may use the indicator to configure and schedule component carriers for the UE. In an example, a UE may determine, for each of one or more supported bands or band combinations, a capability of the UE to process transmissions having a first TTI duration and a second TTI duration, the first TTI duration being shorter than the second TTI duration. The UE may generate an indicator representing the capability for the each of the one or more supported bands or band combinations and transmit the indicator to a base station. The base station may receive the indicator, schedule a component carrier within a frequency band of a first supported band or band combination of the one or more supported bands or band combinations based at least in part on the received indicator, and transmit information within the frequency band of the component carrier based on the scheduling.

Wireless transmissions may use transmission time intervals (TTIs) and shortened transmission time intervals (sTTIs) for uplink or downlink transmissions, in which a length of the sTTI may be shorter than a legacy Long Term Evolution (LTE) subframe or a 1 ms TTI. A receiver, such as a UE, may receive information within one or both of the sTTIs and the TTIs, and transmit a feedback indication, such as an acknowledgment/negative-acknowledgment (ACK/NACK) in a hybrid automatic repeat request (HARQ) feedback routine, to indicate whether the information was successfully received. In some examples, TTIs may transport physical downlink shared channel (PDSCH) information and sTTIs may transport shortened PDSCH (sPDSCH) information.

For an ultra-low latency (ULL) UE, a base station may dynamically schedule TTIs and sTTIs on a subframe by subframe basis, and hence the base station may transmit both PDSCH information and sPDSCH information within a given subframe of a given carrier. If the ULL UE is capable of decoding both PDSCH and sPDSCH, the ULL UE may attempt to decode both and may provide a HARQ ACK/NACK for each of the PDSCH and sPDSCH information. If the ULL UE is not capable of simultaneously decoding PDSCH and sPDSCH, then the ULL UE may decode sPDSCH and skip decoding of the PDSCH. The ULL UE may provide a HARQ ACK/NACK for the sPDSCH and a HARQ NACK for the PDSCH.

Feedback timing for sTTIs differs from feedback timing for TTIs to meet low latency specifications. The ULL UE is to transmit a HARQ ACK/NACK within the duration of a same subframe in which the sTTI is received (e.g., within 1 ms), and may transmit a HARQ ACK/NACK within a defined number of subframes after receiving a TTI (e.g., within 2 ms for HARQ processing timeline of n+3 subframes). Since the base station may dynamically schedule the PDSCH and sPDSCH, there are instances when the ULL UE may process sPDSCH information at the same time (e.g., collide with) as PDSCH information received in one or more prior subframes. For example, if sPDSCH arrives in subframe n, the ULL UE may be processing PDSCH information received in one of the past three subframes.

If processing of PDSCH and sPDSCH collides, there may be instances where the ULL UE lacks sufficient processing capability to simultaneously decode both the PDSCH received in a previous subframe as well as an sPDSCH received in a current subframe to meet the sTTI deadline for providing HARQ ACK/NACK feedback for the sPDSCH. Regardless of the capability of UE to simultaneously decode both PDSCH and sPDSCH scheduled over a subframe of a given component carrier, because of dynamic scheduling, unless a base station is informed of the capabilities of the UE, even a UE that has declared the capability of decoding both PDSCH and sPDSCH scheduled within a subframe of one carrier may not support both sTTI and TTI operations. This same issue may arise in the uplink direction when a ULL UE encodes both physical uplink shared channel (PUSCH) information and shortened PUSCH (sPUSCH) information.

The examples described herein may provide a solution to at least this problem by having a carrier aggregation (CA) capable UE that is able to share processing power over a subset of component carriers to use its processing power to simultaneously process sPDSCH and PDSCH information, simultaneously process PUSCH and sPUSCH information, or both. To coordinate with the base station, the UE may generate and provide an indicator to the base station about the capability of the UE. In an example, a UE may generate an indicator to declare to a base station a set of supportable CA band combinations (supportedBandCombination) (e.g., CA_1A-5A, CA_2A-17A, etc.). In each CA band combination, a downlink supported MIMO capability is defined as a maximum number of spatial layers that the UE may support for spatial multiplexing. For each band and/or band combination specified in supportedBandCombination, the UE may provide in the indicator the corresponding MIMO capability. Based on a total number of spatial layers supported per CA band combination, the UE may declare in the indicator the frequency bands in which the UE may support both TTI and sTTI.

In another example, to reduce the possibility of collisions between processing a TTI and sTTI, the UE may declare to the base station in the indicator a capability of the UE to support Enhanced Physical Downlink Control Channel (ePDCCH) based scheduling and DeModulation Reference Signal (DMRS) based transmission modes (TMs) per component carrier per CA band combination.

Aspects of the disclosure are initially described in the context of a wireless communications system. The wireless communications system may enable a UE to generate an indicator representing a capability of the UE to process transmissions having a sTTI duration and a TTI duration for each of one or more supported bands or band combinations, and a base station may use the indicator to configure and schedule component carriers for the UE. Aspects of the disclosure are further illustrated by and described with reference to apparatus diagrams, system diagrams, and flowcharts that relate to shortened transmission time interval configuration based on user equipment capabilities.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

In an example, a UE 115 may determine its capability to process transmissions having a sTTI duration and a TTI duration for each of one or more supported bands or bands combinations. The UE 115 may generate an indicator representing the capability for the each of the one or more supported bands or band combinations and transmit the indicator to the base station 105. The indicator may also indicate the capability in a band of a band combination. The base station 105 may receive the indicator, schedule a component carrier within a frequency band of a first supported band or band combination of the one or more supported bands or bands combinations based at least in part on the received indicator, and transmit information within the frequency band of the component carrier based on the scheduling.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI duration of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI duration. In other cases, a TTI duration may be shorter than a subframe or may be dynamically selected (e.g., in short TTI duration bursts or in selected component carriers using short TTI durations (for example, sTTIs)).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink component carriers (CCs) and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTI durations, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI duration in eCC may consist of one or multiple symbols. In some cases, the TTI duration (that is, the number of symbols in a TTI duration) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In accordance with the examples described herein, the wireless communications system 100 may enable a UE 115 to generate an indicator representing a capability of the UE to process transmissions having a sTTI duration and a TTI duration for each of one or more supported bands or bands combinations, and a base station 105 may use the indicator to configure and schedule component carriers for the UE.

Figure 2:
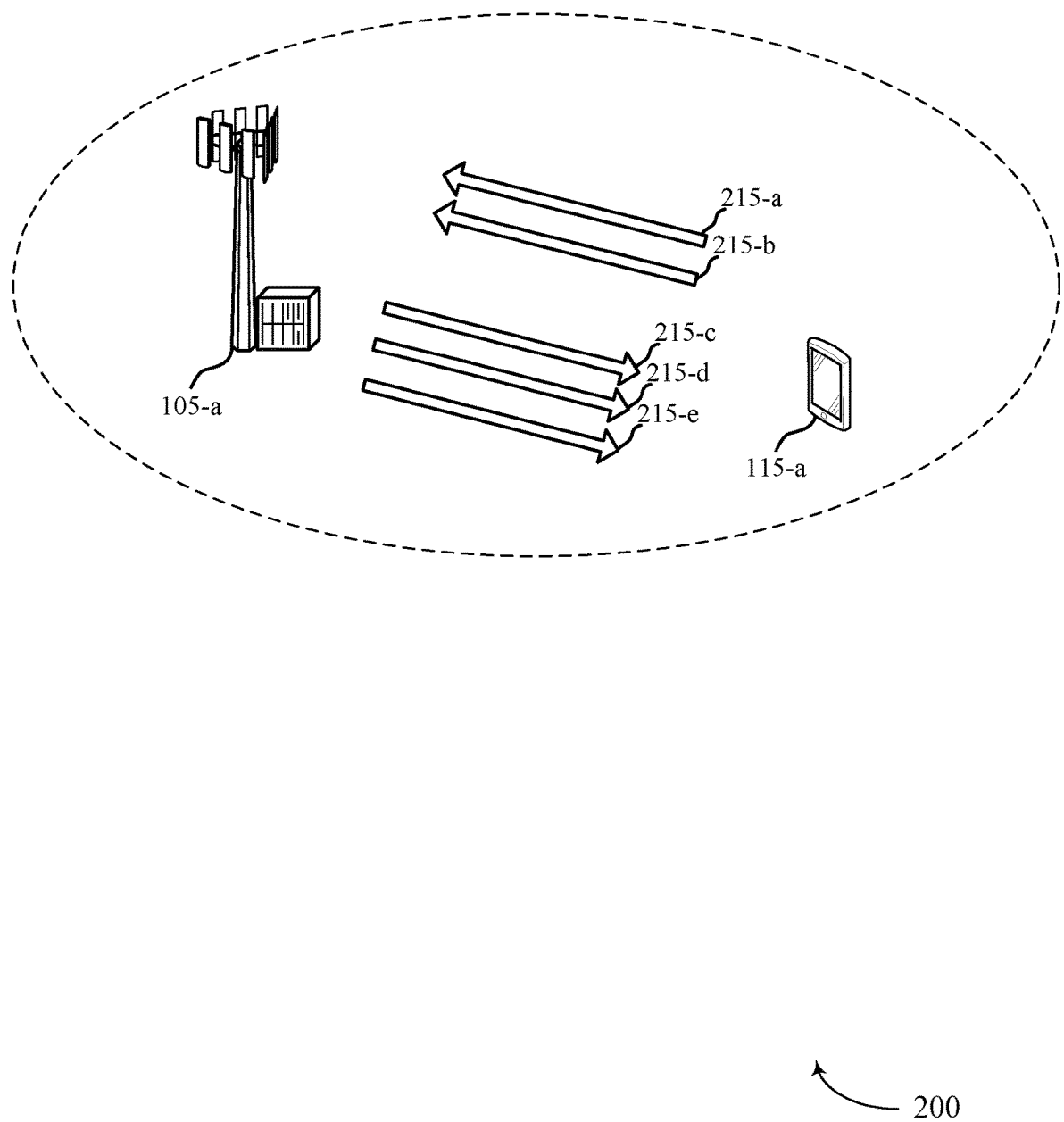
FIG. 2 illustrates an example of a wireless communications system that supports shortened transmission time interval configuration based on user equipment capabilities in accordance with aspects of the present disclosure.

FIG. 2 illustrates an example of a wireless communications system 200 that supports shortened transmission time interval configuration based on user equipment capabilities in accordance with various aspects of the present disclosure.

In some examples, wireless communications system 200 may implement aspects of wireless communication system 100. Wireless communications system 200 includes base station 105-a and a UE 115-a, which may be examples of aspects of the corresponding devices as described above with reference to FIG. 1. In the example of FIG. 2, the wireless communications system 200 may operate according to a radio access technology (RAT) such as an LTE, 5G, or NR RAT, although techniques described herein may be applied to any RAT and to systems that may concurrently use two or more different RATs.

UE 115-a may communicate with base station 105-a via one or more uplink communication links 215-a, 215-b and via one or more downlink communication links 215-c, 215-d, 215-e. The communication links 215 may use MIMO antenna technology, including spatial multiplexing, beamforming, and/or transmit diversity. The communication links 215 may be transmitted using one or more carriers. In an example, the base station 105-a and the UE 115-a may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other in frequency. Allocation of carriers may be asymmetric with respect to downlink (DL) and uplink (UL) (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). In some cases, base station 105-a may allocate TTIs within each component carrier. Each TTI may include time and frequency resources for uplink and downlink transmissions, and the base station 105-a may communicate with one or more UEs 115-a using the TTIs. In some cases, base station 105-a may transmit using mmW frequencies.

Figure 3:
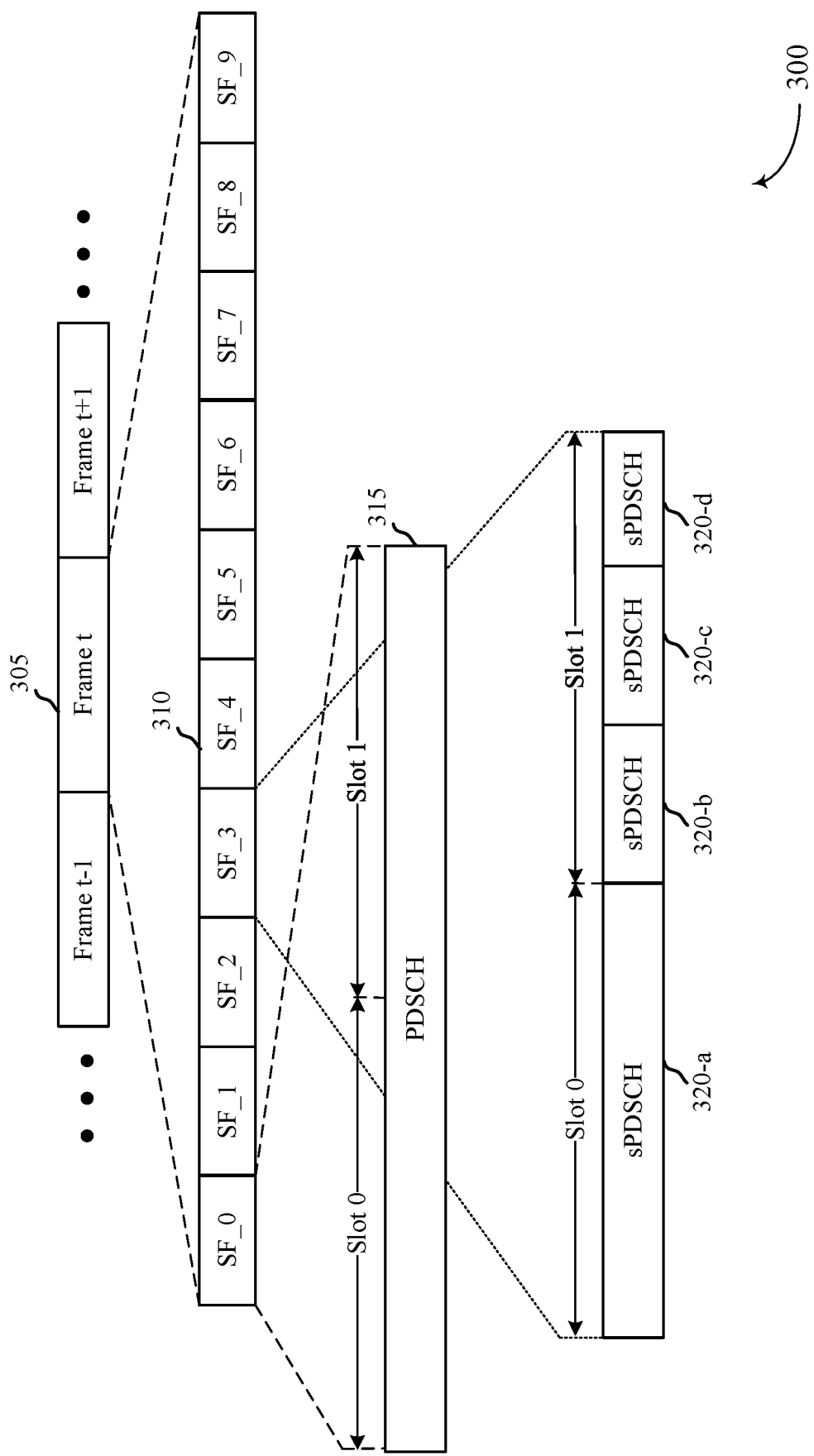
FIG. 3 illustrates an example of a frame structure that supports shortened transmission time interval configuration based on user equipment capabilities in accordance with aspects of the present disclosure.

FIG. 3 illustrates an example of a frame structure 300 that supports shortened transmission time interval configuration based on user equipment capabilities in accordance with various aspects of the present disclosure. A transmission timeline may be partitioned into units referred to herein as radio frames. Depicted are frames t−1, t, and t+1. Each frame 305 may have a defined duration (e.g., 10 milliseconds (ms)) and may be partitioned into a defined number of subframes 310 having corresponding indices (e.g., 10 subframes with indices of 0 through 9). A subframe 310 may be used for uplink communication or downlink communication. In uplink communication, a UE 115 transmits to a base station 105. In downlink communication, a base station 105 communicates to a UE 115. Each subframe 310 may include two slots and each slot may include L symbol periods, e.g., L=7 symbol periods for a normal cyclic prefix or L=6 symbol periods for an extended cyclic prefix. The 2L symbol periods in each subframe may be assigned indices of 0 through 2L−1.

The available time and frequency resources of each subframe 310 may be partitioned into resource blocks (RBs). Each resource block may cover N subcarriers (e.g., 12 subcarriers) in one slot. A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period.

A TTI 315 may be referred to as a duration in time of a subframe 310 (e.g., 1 ms). An sTTI 320 may have a duration that is less than the duration of TTI duration 315. In an example, an sTTI 320 may include two or more symbols, may correspond to a duration of a single slot, or the like. In the depicted examples, sTTI 320-a may have a duration of one slot, and sTTI 320-b, 320-c, and 320-d collectively may have a duration of one slot. In some examples, a TTI 315 may transport PDSCH information in the downlink and PUSCH information in the uplink. A sTTI 320 may transport sPDSCH information in the downlink and sPUSCH in the uplink.

The UE 115-a may generate an indicator to declare its capability information to the base station 105-a to support sTTI per carrier aggregation band combination. The base station 105-a may use the capability information to configure and schedule the UE 115-a. The UE 115-a, using the techniques described herein, may simultaneously process information transmitted within an sTTI duration and a TTI duration to meet low latency specifications for feedback timing.

Figure 4:
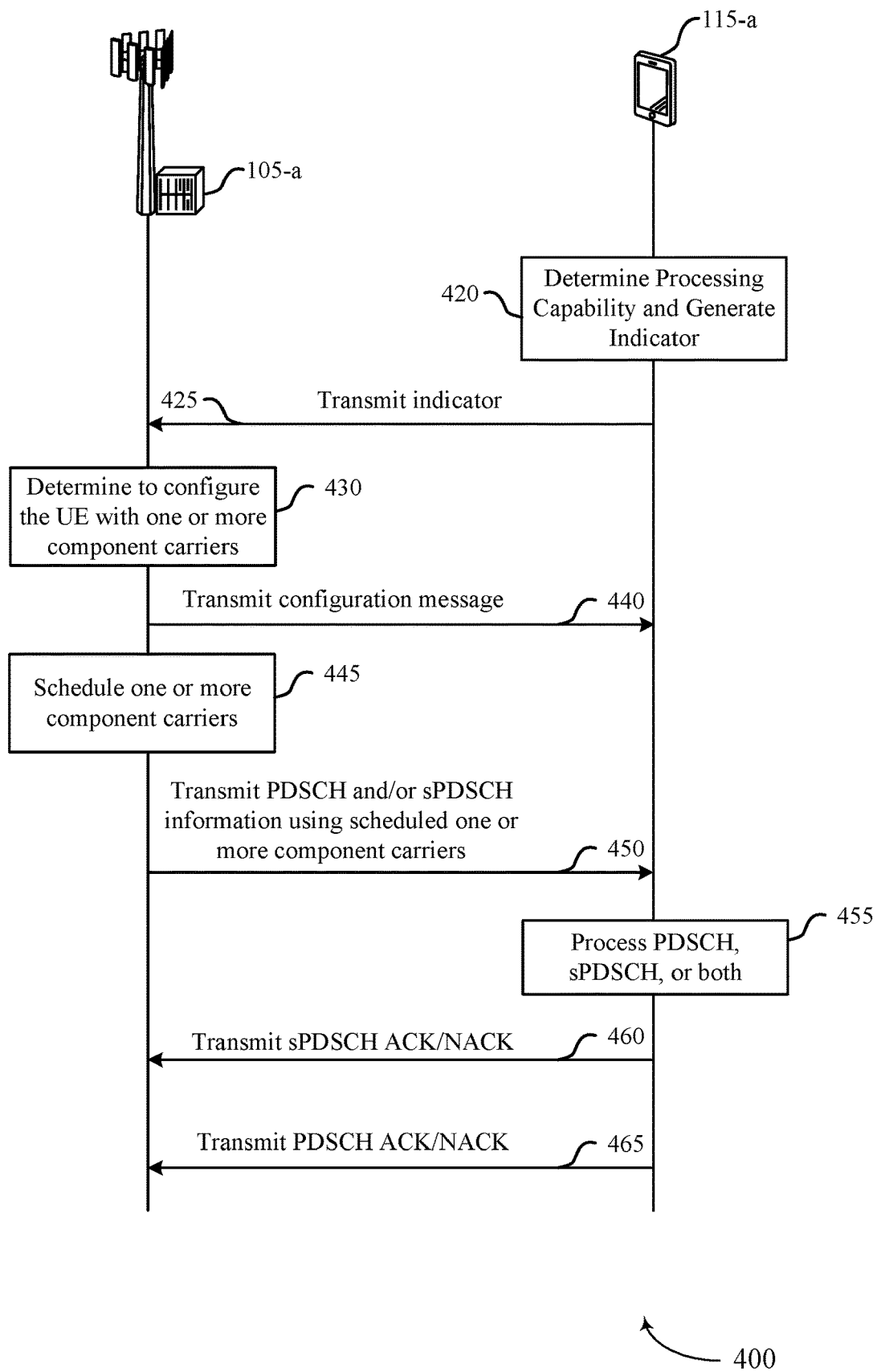
FIG. 4 illustrates an example of a process flow chart that supports shortened transmission time interval configuration based on user equipment capabilities in accordance with aspects of the present disclosure.

FIG. 4 illustrates an example of a process flow chart 400 that supports shortened transmission time interval configuration based on user equipment capabilities in accordance with various aspects of the present disclosure. In flowchart 400, a UE 115-a may have established a connection with a base station 105-a.

At 420, the UE 115-a may determine, for each of one or more supported bands, band combinations, or bands of one or more band combinations, a capability of the UE 115-a to process transmissions having a first transmission time interval (TTI) duration and a second TTI duration, the first TTI duration being shorter than the second TTI duration, and may generate an indicator representing the capability for the each of the one or more supported bands or band combinations. The indicator may be a bit sequence having bit values corresponding to the capability of the UE 115-a. In some cases, processing may include decoding of information included in the transmissions, interpreting the decoded information, or operating based on the interpretation.

In some examples, the indicator may indicate whether UE 115-a is capable of processing a transmission corresponding to a processing timeline, and the indication may indicate different capabilities for uplink transmissions and downlink transmissions. In some examples, the indicator may indicate whether the UE 115-a supports transmissions having a first processing timeline for one or more bands, for one or more band combinations, and for one or more bands of a band combination, and also may respectively indicate support for downlink and uplink transmissions. For instance, the indicator may indicate whether UE 115-a supports a DL HARQ processing timeline, whether the UE 115-a supports a PUSCH scheduling timeline, or both, for one or more bands, for one or more band combinations, and for one or more bands of a band combination.

The UE 115-a may also indicate support for a processing timeline in combination with support for a particular length of TTI duration. For example, the UE 115-a may indicate whether it supports a downlink processing timeline for each of the first TTI duration and the second TTI duration. In another example, the UE 115-a the UE 115-a may indicate whether it supports an uplink processing timeline for each of the first TTI duration and the second TTI duration The UE 115-a may also indicate support for a processing timeline in combination with one or more modes, and also may indicate support for downlink and uplink transmissions. For example, in the case of NR enhanced mobile broadband (eMBB) and NR ultra-reliable low latency communication (URLLC) modes, both communications modes may use a shortened TTI duration that may have a same TTI duration (e.g., a mini-slot TTI), but their processing timelines may be different. For example, the UE 115-a may indicate whether a processing timeline for a first mode (e.g., NR eMBB mode) is supported and whether a processing timeline for a second mode (e.g., NR URLLC mode) is supported. In some examples, the TTI duration of a mode may differ depending on a type of communications mode used between the base station 105-a and the UE 115-a (e.g., an enhanced mobile broadband, massive machine-type communications, or ultra-reliable low latency communications). The indicator may indicate support for a processing timeline when operating in a particular mode for one or more bands, one or more band combinations, and one or more bands of a band combination, and also may indicate support for downlink and uplink transmissions for one or more modes.

In an example, the UE 115-a may determine a set of one or more supportable carrier aggregation (CA) bands or band combinations in which the UE 115-a is capable of processing a first TTI duration (e.g., sTTI 320) and a second TTI duration (e.g., a TTI duration 315). The UE 115-a may also determine a maximum number of spatial layers that the UE 115-a is capable of supporting per component carrier within each of the supported CA band combinations. In some cases, the capability of the UE 115-a may be a function of the number of the spatial layers that the UE 115-a supports in a particular band or band combination. Based on a total number of spatial layers supported per CA band or band combination, the UE 115-a can declare in the indicator the frequency bands in which the UE may support both TTI 315 and sTTI 320.

The UE 115-a may also determine the number of component carriers (CCs) that it can support within each CA band combination (e.g., a maximum number of CCs), and the indicator may indicate the number of CCs. The indicated capability of the UE 115-a may be a function of the number of CCs that the UE 115-a can support in a particular band or band combination. In some cases, the indicator may indicate a defined number (e.g., up to a maximum number) of downlink CCs supported by the UE 115-a and a defined number (e.g., up to a maximum number) of uplink CCs supported by the UE 115-a in a particular band, band combination, or band of a band combination. In some cases, the defined number of downlink or uplink CCs supported by the UE 115-a may be a maximum number of CCs that the UE 115-a may be capable of supporting in a downlink sTTI and/or an uplink sTTI, respectively, in a particular band, band combination, or band of a band combination.

In some cases, the UE 115-a may indicate its capability to support each of one or more simultaneous transmission configurations (e.g., across different PUCCH groups). For example, the base station 105-a may attempt to configure the UE 115-a with multiple transmission configurations (e.g., {2,7} and {7,7} configuration, {2,2} and {2,7} configuration, and {2,2} and {7,7} configuration), and the UE 115-a may indicate how many component carriers it supports within each configuration. In an example, a transmission configuration may be, for example, a {x,y}+{z,w} configuration, and the indicator may indicate the number of supported DL and/or UL CCs for the {x,y}+{z,w} configuration. The configurations may correspond, for example, to one or more physical uplink control channel (PUCCH) groups. For the value pair {x, y}, the value x may indicate a supported DL TTI duration (e.g., x operating symbols (os)) and the value y may indicate a supported UL TTI duration (e.g., y os). In an example, the UE 115-a may support {2,7}+{7,7}, {2,7} across the component carriers in a first PUCCH group, and {7,7} over the component carriers of a second PUCCH group. For these value pairs, the indicator may separately indicate the number of supported component carriers in the DL and UL for each PUCCH group. For example, for the {2,7}+{7,7} configuration, the UE 115-a may indicate in the indicator how many downlink component carriers it supports for the value pair {2,7}, and how many UL component carriers it supports for the value pair {2,7}. The UE 115-a may also indicate, for the second PUCCH group, how many downlink component carriers it supports for the value pair {7,7}, and how many UL component carriers it supports for the value pair {7,7}.

The UE 115-a may determine that its processing capabilities permit differing levels of sTTI support, including that sTTI is supported, sTTI is supported with at least one constraint, and sTTI is not supported.

If sTTI is supported, the UE 115-a may be capable of supporting X spatial layers per component carrier, where X is an integer. To reserve some processing power for sTTIs, the UE 115-a may generate the indicator to represent that the UE 115-a may support Y spatial layers, where Y is an integer that is less than X. Because the UE 115-a declares less than its full processing capability, the UE 115-a may reserve some processing capability that may be used to process transmissions in a sTTI duration and a TTI duration that respectively include PDSCH and sPDSCH information. For example, when PDSCH and sPDSCH are scheduled over a given component carrier, the UE 115-a may utilize the reserved processing capability to simultaneously process streams of PDSCH and sPDSCH information.

The UE 115-a may reserve its processing capabilities for sTTIs in other ways. In some examples, the UE 115-a may indicate support for Enhanced Physical Downlink Control Channel (ePDCCH) based scheduling for a first supported band or band combination of the one or more supported bands or band combinations. For example, the UE 115-a may declare in the indicator that it does not support ePDCCH-based scheduling on component carriers (CCs) of one or more CA band combinations, even if the UE 115-a is capable of supporting ePDCCH when sTTI is not configured. Additionally or alternatively, the UE 115-a may indicate in the indicator its capability to support the following separately: whether the UE 115-a is capable of supporting ePDCCH and sTTI on different serving cells, and whether the UE 115-a is capable of supporting ePDCCH and a shortened processing timeline on different serving cells. In a further example, the UE 115-a may declare in the indicator that it does not support DMRS-based TMs, even if the UE 115-a is capable of supporting DMRS-based TMs when sTTI is not configured. As above, the UE 115-a may use the reserved processing capabilities to simultaneously process streams of PDSCH and sPDSCH information.

If sTTI is supported under at least one constraint, the UE 115-a may specify in the indicator a constraint under which the UE 115-a is capable of processing transmissions having a sTTI duration and a TTI duration that respectively include PDSCH and sPDSCH information. In some examples, the constraint may be a processing constraint on the UE, and the indicator may indicate a different processing constraint on up to each of the one or more supported bands or band combinations. In an example, the UE 115-a may specify a constraint as to when it will discard PDSCH information. If sTTI is scheduled in a frequency band of a CA band combination, the UE 115-a may specify a discard window depth to identify a depth at which the UE 115-a discards PDSCH information from one or more TTI durations 315 received prior to the sTTI 320. For example, the discard window depth may correspond to a defined number Z of TTIs 315 prior to the sTTI 320, and the UE 115-*a* may discard some or all PDSCH information within the discard window depth that is being processed. The value of Z may be declared differently for each band, and the indicator may include a Z value for each band. The UE may declare in the indicator the value of Z for each of the bands as its capability, where the declared DL MIMO capability may be the maximum capability of a UE (instead of a declaration of reduced capability, as described above).

Figure 5:
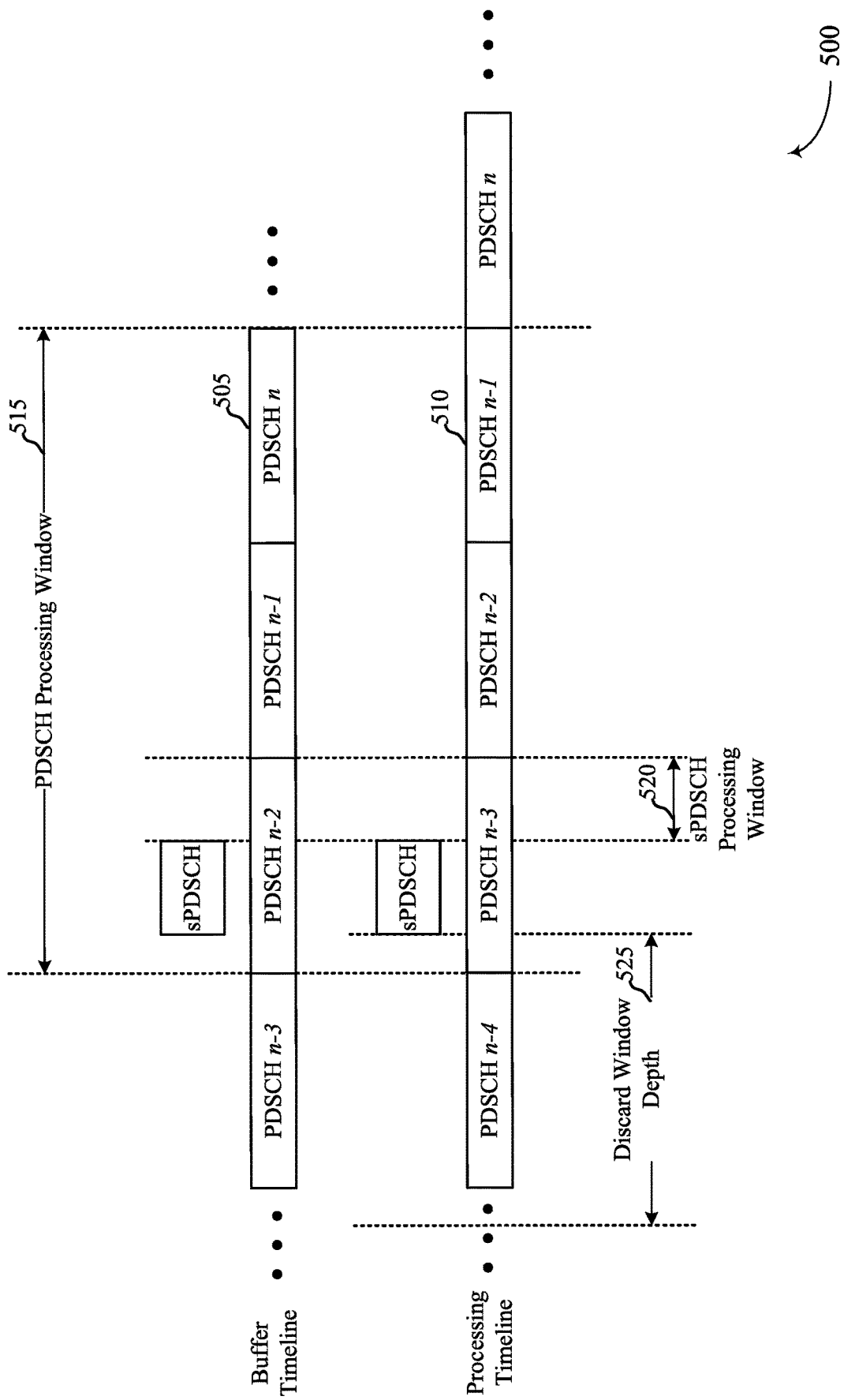
FIG. 5 illustrates an example diagram of buffering and processing timelines that support shortened transmission time interval configuration based on user equipment capabilities in accordance with aspects of the present disclosure.

In some examples, the UE 115-*a* may separately indicate the discard window depth for DL and UL transmissions. For example, the UE 115-*a* may indicate an uplink discard window depth for uplink transmissions in an uplink indicator, and a downlink discard window depth for downlink transmissions in a downlink indicator. In some examples, the UE 115-*a* may separately indicate the discard window depth based at least on different processing timelines for different TTI durations and for UL and DL transmissions. For example, if a length of a downlink TTI duration (e.g., DL sTTI) is 2 operating symbols (e.g., 2 os), the UE may indicate a first discard window length for a n+4 symbol processing timeline, and a second discard window length, different than the first discard window length, for a n+6 symbol processing timeline, where n is an integer number of symbols. FIG. 5 provides an additional discussion of the discard window depth.

The UE 115-*a* may declare other constraints in the indicator. For example, the UE 115-*a* may specify that ePDCCH-based scheduling and/or DMRS-based TMs are not supported to enable the UE 115-*a* to support sTTI.

If sTTI is not supported, the UE 115-*a* may specify in the indicator that sTTI is not supported in one or more of the CA band combinations. In such case, the base station 105-*a* may not schedule sTTI over component carriers of a given band within the CA band combinations.

In another example, the UE 115-*a* may determine a relationship between the number of CCs for TTIs that it can support relative to the number of CCs for sTTIs that it can support, and may signal the relationship in the indicator. For example, the UE 115-*a* may specify that each CC of sTTI that the UE 115-*a* can support is equivalent to 2CCs of TTIs that the UE 115-*a* can support. For example, the UE 115-*a* may declare the following capabilities: (1) 10CCs for only TTIs, (2) 8CCs for TTIs and 1CC for sTTI, (3) 6CCs for TTIs and 2CCs for sTTIs, and so on.

In some examples, sTTI support for uplink transmissions may be different from sTTI support for downlink transmissions. To account for these differences, the UE 115-*a* may specify the UE capabilities in the indicator separately and/or independently for uplink and downlink transmissions. In some examples, a length of a TTI duration supported by the UE may be indicated separately for UL transmissions and DL transmissions. For example, a downlink indicator may indicate a length of a TTI duration that the UE 115-*a* supports for downlink transmissions (e.g., supported DL TTI duration), and an uplink indicator may indicate a length of a TTI duration that the UE supports for uplink transmissions (e.g., supported UL TTI duration). In some examples, the downlink indicator and the uplink indicator may be a joint indicator that indicates a first length of a TTI duration supported for downlink transmissions and a second length of a TTI duration supported for uplink transmissions. For example, the UE 115-*a* may indicate in a downlink indicator that it can support a 2 operating symbol (os) sTTI for downlink transmissions (e.g., 2 os sTTI in the DL), and in an uplink indicator that it can support a 7 operating symbol sTTI for uplink transmissions (e.g., 7 os sTTI in the UL). In some cases, the UE 115-*a* may use a joint indicator to indicate that the UE 115-*a* can support a 2 os sTTI for DL transmissions and a 7 os sTTI for UL transmissions. For example, the indicator may indicate support for a {2,7} configuration, where a first value in the {2,7} value pair corresponds to the supported DL TTI duration and the second value in the value pair corresponds to the supported UL TTI duration. The indicator may indicate a length of a TTI duration for DL and/or UL transmissions supported by the UE for one or more bands, for one or more band combinations, and for one or more bands of a band combination.

In an example, the amount of processing power to support sTTI may be different in the downlink as compared to the uplink. In some examples, the UE 115-*a* may utilize less computational power for encoding to generate PUSCH and sPUSCH information as compared to decoding PDSCH and sPDSCH information. In some instances, the UE 115-*a* may signal in the indicator that sTTI is supported in the uplink, but is not supported or supported with constraints in the downlink. For example, the indicator may include an uplink indicator that indicates a capability of the UE 115-*a* to process an uplink sTTI in each supported carrier aggregation band combination and a downlink indicator that indicates a capability of the UE 115-*a* to process a downlink sTTI in each supported carrier aggregation band combination. In some examples, the UE 115-*a* may determine a discard window depth for dropping a TTI transmission when the UE 115-*a* is not capable of simultaneously processing a TTI and a sTTI in a particular subframe for a supported band or band combination. In some cases, a discard window depth for uplink transmissions may differ from a discard window depth for downlink transmissions.

In some examples, sTTIs may have different lengths (e.g., different number of symbols, different number slots, or the like). The UE 115-*a* may specify capabilities in the indicator separately for sTTIs of different lengths in each CA band or CA band combination, where the capabilities may be a function of the length of sTTIs. In some examples, the length of a sTTI may range from two symbols to an entire slot, and the length may differ in the uplink and downlink directions. In some instances, the UE 115-*a* may signal in the indicator whether sTTI is supported for each sTTI length in each CA band combination.

In some examples, the UE 115-*a* may specify in the indicator the capability of supporting sTTI per frequency band per CA band combination. For example, the UE 115-*a* may declare in the indicator the capability of supporting sTTI in a frequency band under one or more constraints, and declaring the capability of decoding sPDSCH and PDSCH scheduled within a subframe of a given CC in the that band. In another example, the UE 115-*a* may declare in the indicator the capability of supporting sTTI under some constraints in a band, and declaring in the indicator not being able to decode both PDSCH and sPDSCH scheduled in one subframe of a given CC in that band.

In some examples, the UE 115-*a* may specify in the indicator whether Enhanced Physical Downlink Control Channel (ePDCCH) based scheduling is supported per component carrier per carrier aggregation band combination. The UE 115-*a* may also specify in the indicator whether DeModulation Reference Signal (DMRS) based transmission modes (TMs) are supported per component carrier per carrier aggregation band combination.

At 425, the UE 115-a may generate the indicator representing the capability of the UE for the each of the one or more supported bands or band combinations and may transmit the indicator to the base station 105-a.

At 430, the base station 105-a may process the indicator and configure the UE 115-a with one or more component carriers based on the indicator. In an example, the base station 105-a may process the indicator to determine a maximum number of component carriers that the UE 115-a may support. In some instances, to provide the base station 105-a with flexibility to select which component carriers to schedule, the base station 105-a may determine to configure the UE 115-a with a number of component carriers that exceeds the maximum number of component carriers that the UE 115-a can support. In conventional systems, a UE 115-a that receives a configuration message attempting to configure the UE 115-a with more than the maximum number of component carriers would declare a configuration error. In the examples described herein, instead of declaring a configuration error, the UE 115-a may rely on scheduling decisions of the base station 105-a. If, however, the number of scheduled CCs for both TTI and sTTI is such that a UE 115-a cannot simultaneously process both, then the UE 115-a may select to drop transmission received in one of the TTI duration and the sTTI duration, and may send a NACK for the information (e.g., dropped packets) being dropped. The UE 115-a may transmit such an indicator to the base station 105-a and receive a configuration message indicating a first number of CCs in a first supported band or band combination of one or more supported bands or band combinations that exceeds the defined number of UL CCs for a UL transmission during an sTTI or the defined number of DL CCs for a DL transmission during an sTTI.

At 440, the base station 105-a may transmit a configuration message to the UE 115-a with the determined configuration and the UE 115-a may apply the configuration. The configuration message may configure the UE 115-a to receive one or more component carriers in one or more frequency bands in one or more CA band combinations. In some examples, the configuration message may configure the UE 115-a to receive more component carriers in one or more frequency bands in one or more CA band combinations than the UE 115-a is capable of supporting.

At 445, the base station 105-a may schedule one or more component carriers within a frequency band of a CA band combination supported by the UE 115-a based on the indicator. In an example, the base station 105-a may schedule transmissions of PDSCH information in TTIs and, if supported, sPDSCH information in sTTIs within a frequency band of a supported CA band combination on one or more component carriers.

At 450, the base station 105-a may transmit PDSCH information in TTIs and, if supported, sPDSCH information in sTTIs within a frequency band of a supported CA band combination on one or more component carriers based on the scheduling.

At 455, the UE 115-a may process the PDSCH and/or sPDSCH information in accordance with the capability represented in the indicator. Additional aspects of processing the PDSCH and/or sPDSCH information are described below with reference to FIG. 5. In some examples, the UE 115-a may determine that the base station 105-a has scheduled more component carriers than the UE 115-a is capable of supporting. In such cases, the UE 115-a may drop PDSCH information, sPDSCH information, or both, transmitted on the excess component carriers. The UE 115-a may then transmit a negative acknowledgment for the dropped PDSCH information and/or sPDSCH information.

At 460, the UE 115-a may transmit an ACK/NACK for the sPDSCH information, if any, in accordance with the sTTI acknowledgement timeline. In an example, the UE 115-a may process sPDSCH information transmitted within a sTTI of a subframe 310 and respond with an acknowledgement message (e.g., ACK/NACK) before the end of that subframe 310.

At 465, the UE 115-a may transmit an ACK/NACK for the PDSCH information, if any, in accordance with the TTI acknowledgement timeline. In an example, the UE 115-a may process PDSCH information transmitted within a TTI of a subframe 310 and respond with an acknowledgement message (e.g., ACK/NACK) up to a defined number of subframes later (e.g., HARQ at n+3 subframes later).

The operations in flowchart 400 may repeat one or more times. In some instances, the operations 450 to 465 may repeat as the base station 105-a transmits PDSCH and/or sPDSCH information and the UE 115-a acknowledges the PDSCH and/or sPDSCH information.

FIG. 5 illustrates an example diagram of buffering and processing timelines that support shortened transmission time interval configuration based on user equipment capabilities in accordance with various aspects of the present disclosure. Buffer timeline 505 and processing timeline 510 are depicted with time proceeding from left to right. The buffer timeline 505 depicts the times when a TTI containing PDSCH information is received, with PDSCH information from TTI n−3 shown on the left, followed by TTI n−2, TTI n−1, and TTI n. The buffer timeline 505 also depicts the times when sTTIs containing sPDSCH information is received.

The processing timeline 510 depicts when the UE 115-a begins processing received PDSCH and/or sPDSCH information relative to when the PDSCH and/or sPDSCH information is buffered. As depicted, there is a lag between when the PDSCH information of a particular TTI is buffered relative to when the PDSCH information of the particular TTI is processed. In an example, there may be a 1 ms delay between when PDSCH information of TTI n−3 is buffered to when the UE 115-a begins processing the PDSCH information of the TTI n−3. As seen by comparing buffer timeline 505 and processing timeline 510, the UE 115-a may attempt to begin processing sPDSCH information as soon as it is buffered or as soon as practical.

Based on a TTI feedback timeline (e.g., an n+3 HARQ timing rule), the UE 115-a may have a defined amount of time (e.g., a processing timeline) during which to process the PDSCH information and respond with an ACK or a NACK. The defined amount of time is referred to herein as a PDSCH processing window 515, and the processing window for PDSCH information from TTI n−3 is depicted. Likewise, based on a sTTI feedback timeline, the UE 115 may have a defined amount of time during which to process the sPDSCH information and respond with an ACK or a NACK. The defined amount of time is referred to herein as an sPDSCH processing window 520, and the sPDSCH processing window 520 expires at the end of the same subframe in which the sPDSCH is received.

In some examples, receipt of the sPDSCH information in a sTTI by the UE 115-a may not overlap with receipt of PDSCH information in a TTI, but processing durations of the sPDSCH information may at least at least partially overlap in time with processing of PDSCH information. For example, as shown in the processing timeline 510, processing of the sPDSCH information overlaps with processing of the PDSCH information from TTI n−3. The UE 115-*a* may transmit a first acknowledgement message for sPDSCH information based at least in part on an acknowledgement timeline for sTTI and a second acknowledgement message for the PDSCH information based at least in part on an acknowledgement timeline for the TTI.

As noted above, the UE 115-*a* may support sTTI with a discard window depth constraint. A discard window depth 525 is depicted illustrating a depth at which the UE 115-*a* may discard PDSCH information received prior to the sPDSCH. If the indicator specifies that sTTI is supported under a discard window depth constraint, when sPDSCH is received in a particular subframe, the UE 115-*a* may discard PDSCH information from one or more TTIs received prior to the sPDSCH. In the depicted example, the UE 115-*a* may discard PDSCH information from TTI n−4. If the discard window depth 525 includes PDSCH information from multiple TTIs, the UE 115-*a* discard some or all of the PDSCH information.

In some examples, the UE 115-*a* may determine a sum of a maximum transport block size (TBS) and/or number of resource blocks of PDSCH information within a processing window 515 and a TB S and/or number of resource blocks of the sPDSCH information within the processing window 515 prior to discarding some or all of the PDSCH information. In an example, the UE 115-*a* may have a processing capability to process a defined amount of data (e.g., maximum transport block size (TB S), maximum number of RBs) within an amount of time corresponding to a duration of a processing window 515. The UE 115-*a* may determine a sum of a maximum TBS and/or number of resource blocks of PDSCH information within a processing window 515 and a TBS and/or number of resource blocks of the sPDSCH information within the processing window 515 waiting to be processed for comparison to a processing rate threshold. The processing rate threshold may be the defined amount of data (e.g., maximum transport block size (TBS), maximum number of RBs) that the UE 115-*a* is capable of processing within the duration of the processing window 515. If the sum satisfies the threshold (e.g., is less than the threshold), the UE 115-*a* may determine not to discard any of the PDSCH information. If the sum does not satisfy the threshold (e.g., meets or exceeds the threshold), the UE 115-*a* may determine discard the PDSCH information of one or more subframes so that a newly calculated sum satisfies the threshold.

Advantageously, the examples described herein enable a UE 115-*a* to generate an indicator representing a capability of the UE 115-*a* to process transmissions having a sTTI duration and a TTI duration for each of one or more supported bands or band combinations, and the base station 105-*a* may use the indicator to configure and schedule component carriers for the UE 115-*a*.

Figure 6:
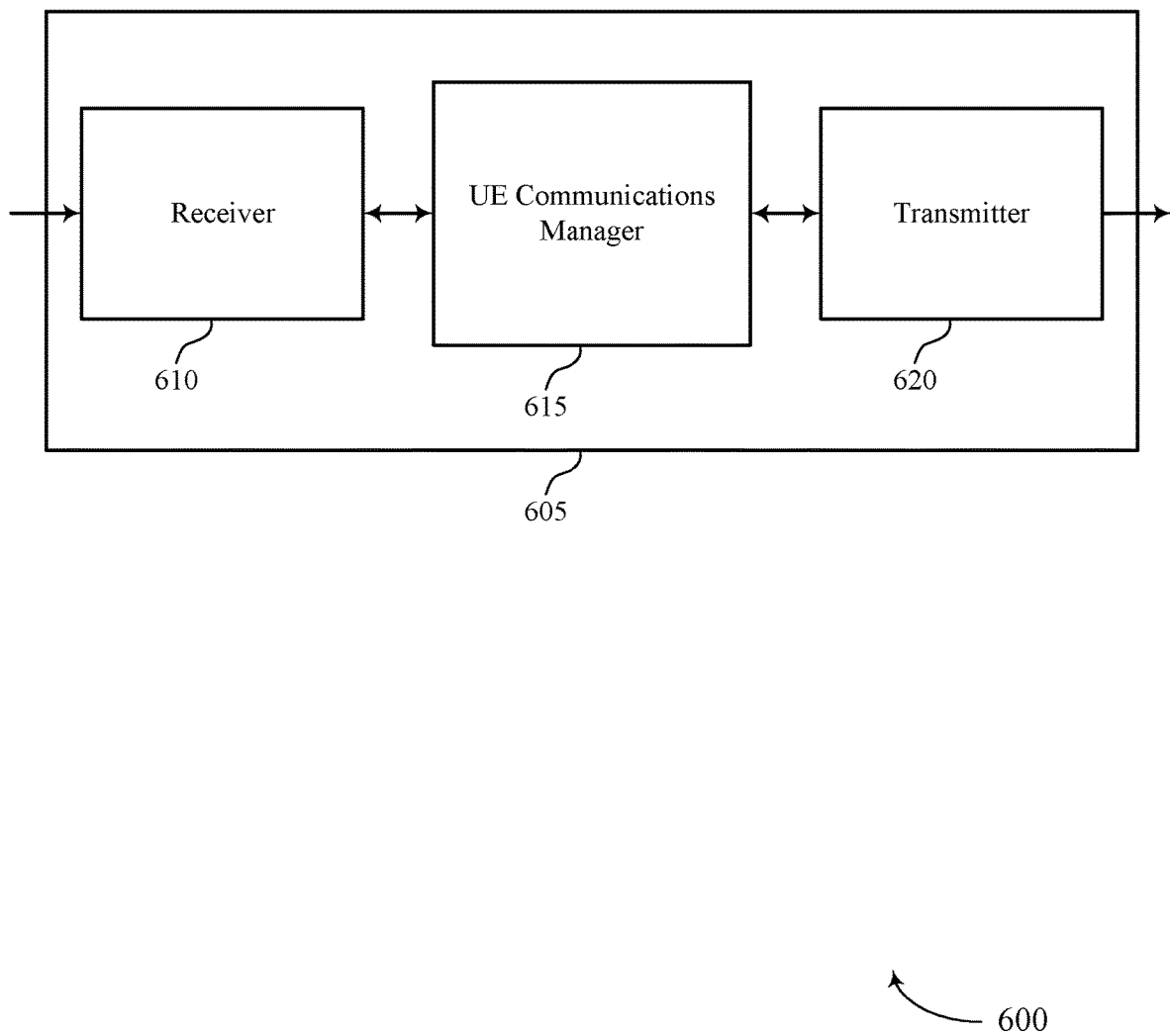
FIGS. 6 through 8 show block diagrams of a device that supports shortened transmission time interval configuration based on user equipment capabilities in accordance with aspects of the present disclosure.

FIG. 6 shows a block diagram 600 of a wireless device 605 that supports shortened transmission time interval configuration based on user equipment capabilities in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to shortened transmission time interval configuration based on user equipment capabilities, etc.). Information may be passed on to other components of the device. Receiver 610 may be an example of aspects of transceiver 935 described with reference to FIG. 9. Receiver 610 may utilize a single antenna or a set of antennas.

UE communications manager 615 may be an example of aspects of UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may determine, for each of one or more supported bands or band combinations, a capability of the UE 115 to process transmissions having a first transmission time interval (TTI) duration and a second TTI duration, the first TTI duration being shorter than the second TTI duration, generate an indicator representing the capability for the each of the one or more supported bands or band combinations, and transmit the indicator to a base station 105.

Transmitter 620 may transmit signals generated by other components of the device. In some examples, transmitter 620 may be collocated with receiver 610 in a transceiver module. For example, transmitter 620 may be an example of aspects of the transceiver 935 described with reference to FIG. 9. Transmitter 620 may utilize a single antenna or a set of antennas.

Figure 7:
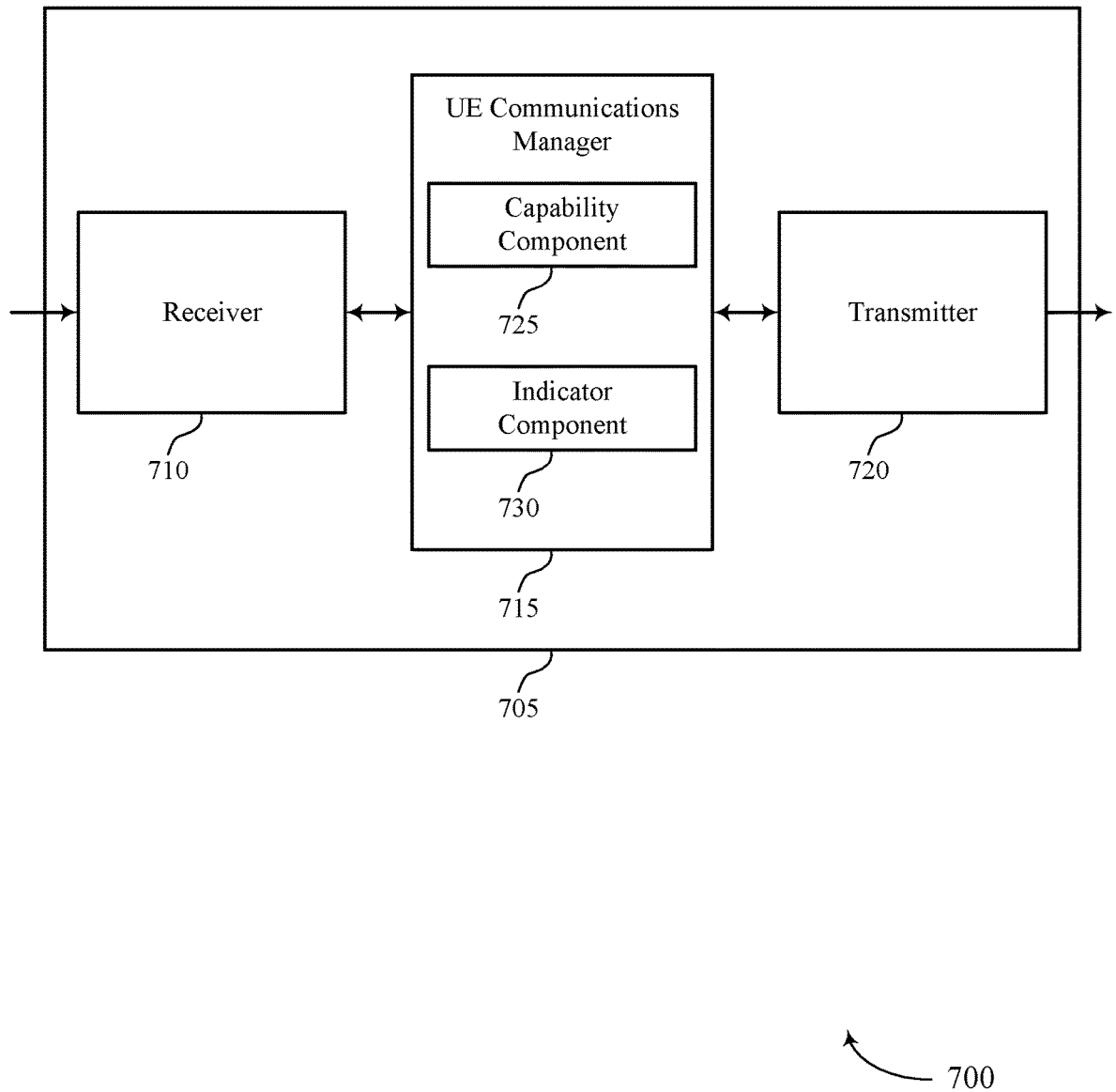

FIG. 7 shows a block diagram 700 of a wireless device 705 that supports shortened transmission time interval configuration based on user equipment capabilities in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to shortened transmission time interval configuration based on user equipment capabilities, etc.). Information may be passed on to other components of the device. Receiver 710 may be an example of aspects of the transceiver 935 described with reference to FIG. 9. Receiver 710 may utilize a single antenna or a set of antennas.

UE communications manager 715 may be an example of aspects of UE communications manager 915 described with reference to FIG. 9.

UE communications manager 715 may also include capability component 725 and indicator component 730.

Capability component 725 may determine a capability of the UE 115 to process transmissions having a first TTI duration and a second TTI duration, the first TTI duration being shorter than the second TTI duration.

Indicator component 730 may generate an indicator representing the capability for the each of the one or more supported bands or band combinations and transmit the indicator to a base station. In some cases, the indicator indicates that the UE 115 is capable of simultaneously processing transmissions in the first TTI duration and the second TTI duration in a carrier aggregation band combination. In some cases, the indicator indicates that the UE 115 is not capable of processing transmissions in the first TTI duration in a carrier aggregation band combination. In some cases, the indicator indicates a capability of the UE 115 to process the first TTI duration in each of a set of carrier aggregation band combinations. In some cases, the indicator includes an uplink indicator that indicates a capability of the UE 115 to process an uplink instance of the first TTI duration in a carrier aggregation band combination and a downlink indicator that indicates a capability of the UE 115 to process a downlink instance of the first TTI duration in the carrier aggregation band combination. In some cases, the indicator indicates a capability of the UE 115 to process transmissions in a first instance of the first TTI duration having a first length in a carrier aggregation band combination and a capability of the UE 115 to process transmissions in a second instance of the first TTI duration having a second length in the carrier aggregation band combination. In some cases, the indicator indicates whether ePDCCH based scheduling is supported per component carrier per carrier aggregation band combination. In some cases, the indicator indicates whether DMRS based TMs are supported per component carrier per carrier aggregation band combination. In some cases, indicator component 730 may transmit a per component carrier indication of support for the first TTI duration. In some cases, the indication specifies a constraint on the capability.

In some cases, for each band in the each of the one or more supported bands or band combinations, the indicator indicates a capability of the UE 115 to support transmissions having the first TTI duration and the second TTI duration on the each band while the UE 115 operates in the each of the one or more supported bands or band combinations. In some cases, the indication indicates a constraint on the capability when the UE 115 operates in the each of the one or more supported bands or band combinations. In some examples of the method, apparatus, and non-transitory computer-readable medium described above, the constraint may be a processing constraint of the UE. In some cases, the processing constraint is a discard window depth associated with a maximum transport block size, a maximum number of resource blocks, or both. In some cases, the processing constraint is associated with Enhanced Physical Downlink Control Channel (ePDCCH) based scheduling, or DeModulation Reference Signal (DMRS) based transmission modes (TMs), or both. In some cases, indicator component 730 may determine that the UE 115 is capable of simultaneously processing transmissions in the first TTI duration and the second TTI duration while operating in the each of the one or more supported bands or band combinations, wherein the indicator represents that the UE 115 is capable of simultaneously processing transmissions in the first TTI duration and the second TTI duration.

Transmitter 720 may transmit signals generated by other components of the device. In some examples, transmitter 720 may be collocated with receiver 710 in a transceiver module. For example, transmitter 720 may be an example of aspects of transceiver 935 described with reference to FIG. 9. Transmitter 720 may utilize a single antenna or a set of antennas.

Figure 8:
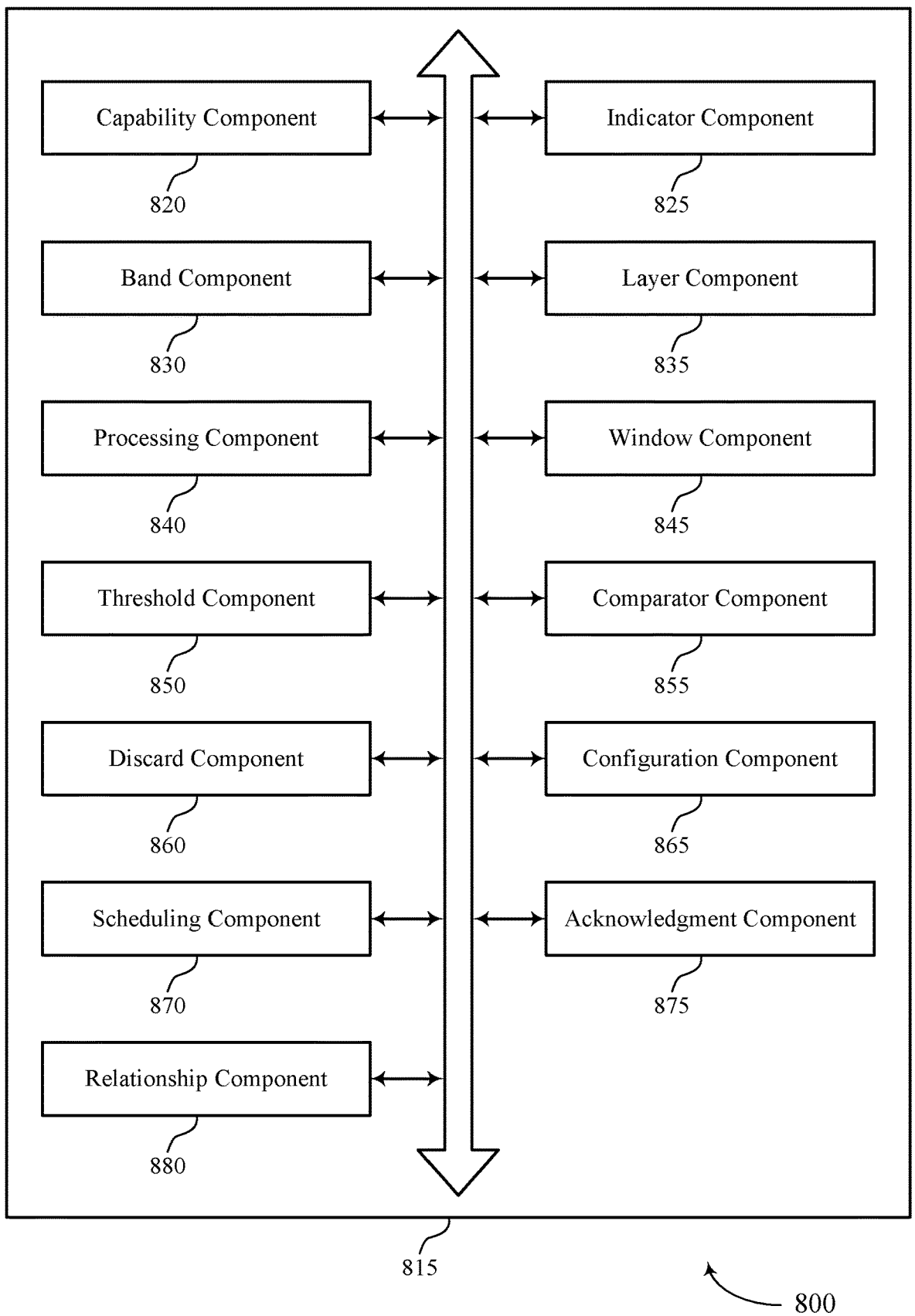

FIG. 8 shows a block diagram 800 of UE communications manager 815 that supports shortened transmission time interval configuration based on user equipment capabilities in accordance with aspects of the present disclosure. UE communications manager 815 may be an example of aspects of UE communications manager 615, 715, or 915 described with reference to FIGS. 6, 7, and 9. UE communications manager 815 may include capability component 820, indicator component 825, band component 830, layer component 835, processing component 840, window component 845, threshold component 850, comparator component 855, discard component 860, configuration component 865, scheduling component 870, acknowledgment component 875, and relationship component 880. Each of these modules may communicate, directly or indirectly, with one another (e.g., via one or more buses).

Capability component 820 may determine, for each of one or more supported bands or band combinations, a capability of the UE 115 to process transmissions having a first TTI duration and a second TTI duration, the first TTI duration being shorter than the second TTI duration.

Indicator component 825 may generate an indicator representing the capability for the each of the one or more supported bands or band combinations and transmit the indicator to a base station. In some cases, the indicator indicates that the UE 115 is capable of simultaneously processing transmissions in the first TTI duration and the second TTI duration in a carrier aggregation band combination. In some cases, the indicator indicates that the UE 115 is not capable of processing transmissions in the first TTI duration in a carrier aggregation band combination. In some cases, the indicator indicates a capability of the UE 115 to process transmissions in the first TTI duration in each of a set of carrier aggregation band combinations. In some cases, the indicator includes an uplink indicator that indicates a capability of the UE 115 to process transmissions in an uplink instance of the first TTI duration in a carrier aggregation band combination and a downlink indicator that indicates a capability of the UE 115 to process transmissions in a downlink instance of the first TTI duration in the carrier aggregation band combination. In some cases, the indicator indicates a capability of the UE 115 to process transmissions in a first instance of the first TTI duration having a first length in a carrier aggregation band combination and a capability of the UE 115 to process transmissions in a second instance of the first TTI duration having a second length in the carrier aggregation band combination. In some cases, the indicator indicates whether ePDCCH based scheduling is supported per component carrier per carrier aggregation band combination. In some cases, the indicator indicates whether DMRS based TMs are supported per component carrier per carrier aggregation band combination. In some cases, indicator component 825 may transmit a per component carrier indication of support for the first TTI duration. In some cases, the indication specifies a constraint on the capability.

In some cases, for each band in the each of the one or more supported bands or band combinations, the indicator indicates a capability of the UE 115 to support transmissions having the first TTI duration and the second TTI duration on the each band while the UE 115 operates in the each of the one or more supported bands or band combinations. In some cases, the indication indicates a constraint on the capability when the UE 115 operates in the each of the one or more supported bands or band combinations. In some examples of the method, apparatus, and non-transitory computer-readable medium described above, the constraint may be a processing constraint of the UE. In some cases, the processing constraint is a discard window depth associated with a maximum transport block size, a maximum number of resource blocks, or both. In some cases, the processing constraint is associated with Enhanced Physical Downlink Control Channel (ePDCCH) based scheduling, or DeModulation Reference Signal (DMRS) based transmission modes (TMs), or both. In some cases, indicator component 825 may determine that the UE 115 is capable of simultaneously processing transmissions in the first TTI duration and the second TTI duration while operating in the each of the one or more supported bands or band combinations, wherein the indicator represents that the UE 115 is capable of simultaneously processing transmissions in the first TTI duration and the second TTI duration.

Band component 830 may determine one or more carrier aggregation bands or band combinations supported by the UE 115 and in which the UE 115 is capable of simultaneously processing transmissions in the first TTI duration and the second TTI duration, where the indicator is generated based on the determined one or more carrier aggregation bands or band combinations.

Layer component 835 may determine a number of spatial layers that the UE 115 is configured to support per component carrier in a carrier aggregation band combination, where the indicator is generated based on the determined number of spatial layers. Layer component 835 may determine that the UE 115 is capable of supporting a first number of spatial layers per component carrier in a carrier aggregation band combination, where the indicator indicates that the UE 115 is capable of supporting a second number of spatial layers that is less than the first number of spatial layers.

Processing component 840 may process first information of the first TTI duration and second information of the second TTI duration in accordance with the capability, process the first information and the second information received in the one or more instances of the second TTI duration, and determine that processing durations of the first information and the second information are overlapping.

Window component 845 may determine a discard window depth to identify a depth at which the UE 115 discards the second information received in one or more instances of the second TTI duration prior to the first TTI duration, where the indicator indicates the discard window depth.

Threshold component 850 may determine a sum of a maximum transport block size (TBS) and/or number of resource blocks of the second information within a processing window and a TBS and/or number of resource blocks of the first information within the processing window and compare the sum to a threshold. In an example, threshold component 850 may determine a sum of a maximum PDSCH TBS and/or number of RBs within a processing window and sPDSCH TBS and/or number of RBs within the window. In an example, threshold component 850 may determine a sum of a maximum PDSCH TBS and/or number of RBs within a processing window and sPDSCH TBS and/or number of RBs within the window.

Comparator component 855 may determine that the sum does not satisfy the threshold. In some cases, comparing the sum to the threshold includes: determining that the sum satisfies the threshold.

Discard component 860 may discard at least some of the second information received in the one or more instances of the second TTI duration and drop one or both of first information of the first TTI duration or second information of the second TTI duration transported in one or more of the scheduled third number of CCs.

Configuration component 865 may receive, based on the indicator, a configuration message that configures the UE 115 with a first number of component carriers (CCs) in a carrier aggregation band combination that exceeds a second number of CCs that the UE 115 is capable of supporting. In some cases, the second number of CCs may be a maximum number of CCs specified in the indicator that the UE 115 is configured to support.

Scheduling component 870 may determine that the base station 105 has scheduled a third number of CCs for the UE 115 that exceeds the second number of CCs.

Acknowledgment component 875 may transmit a negative acknowledgment for the dropped one or both of the first information or the second information and transmit a first acknowledgement message for the first information based on an acknowledgement timeline for the first TTI duration and a second acknowledgement message for the second information based on an acknowledgement timeline for the second TTI duration.

Relationship component 880 may determine a relationship between a number of component carriers (CCs) that the UE 115 supports for the first TTI duration and the second TTI duration, where the indicator indicates the relationship.

Figure 9:
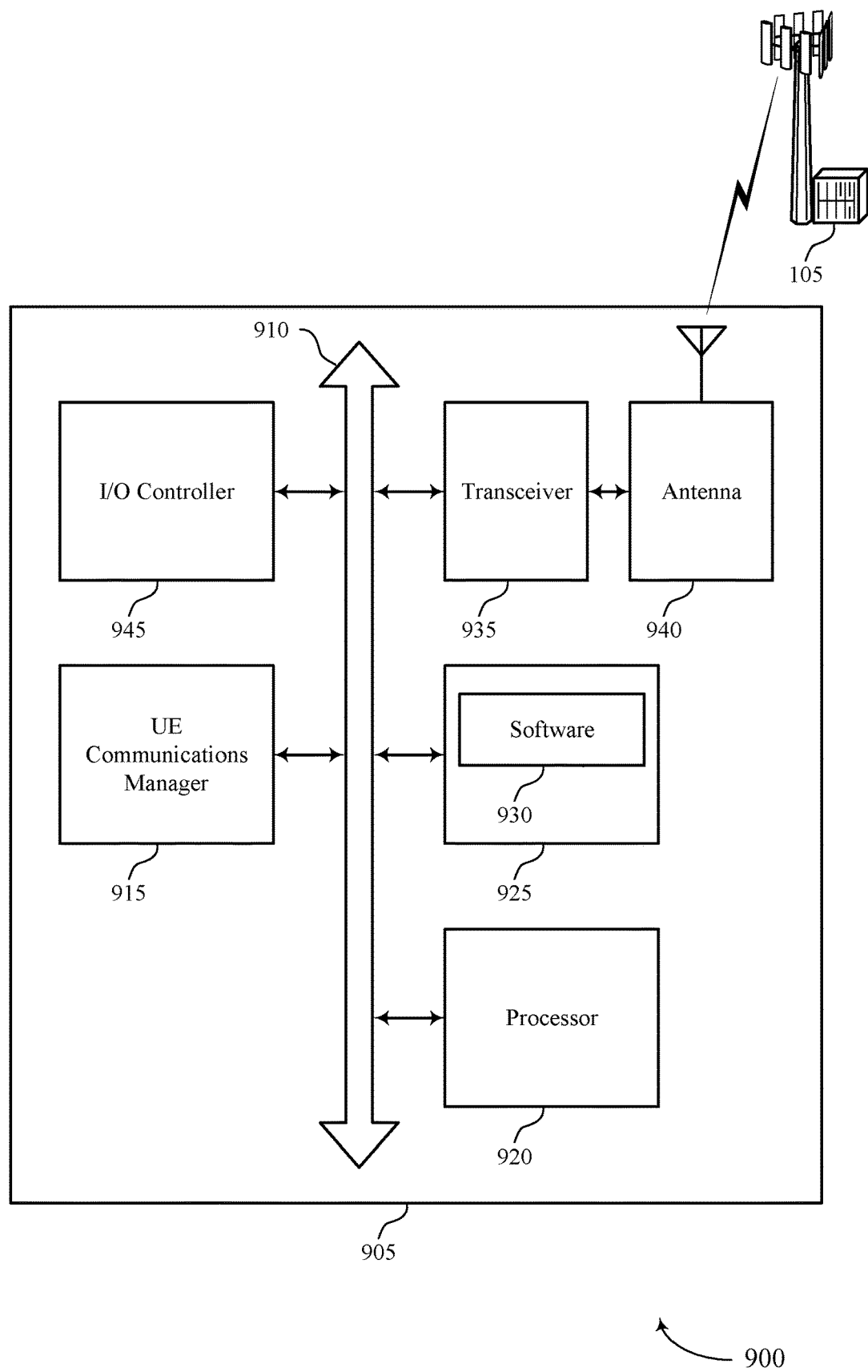
FIG. 9 illustrates a block diagram of a system including a user equipment (UE) that supports shortened transmission time interval configuration based on user equipment capabilities in accordance with aspects of the present disclosure.

FIG. 9 shows a diagram of a system 900 including a device 905 that supports shortened transmission time interval configuration based on user equipment capabilities in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting shortened transmission time interval configuration based on user equipment capabilities).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support shortened transmission time interval configuration based on user equipment capabilities. Software 930 may be stored in a non-transitory computer-readable medium such as system memory or other memory. In some cases, software 930 may not be directly executable by the processor but may cause a computer (e.g., when compiled and executed) to perform functions described herein.

Transceiver 935 may communicate bi-directionally, via one or more antennas, wired, or wireless links as described above. For example, transceiver 935 may represent a wireless transceiver and may communicate bi-directionally with another wireless transceiver. Transceiver 935 may also include a modem to modulate the packets and provide the modulated packets to the antennas for transmission, and to demodulate packets received from the antennas.

In some cases, the wireless device 905 may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
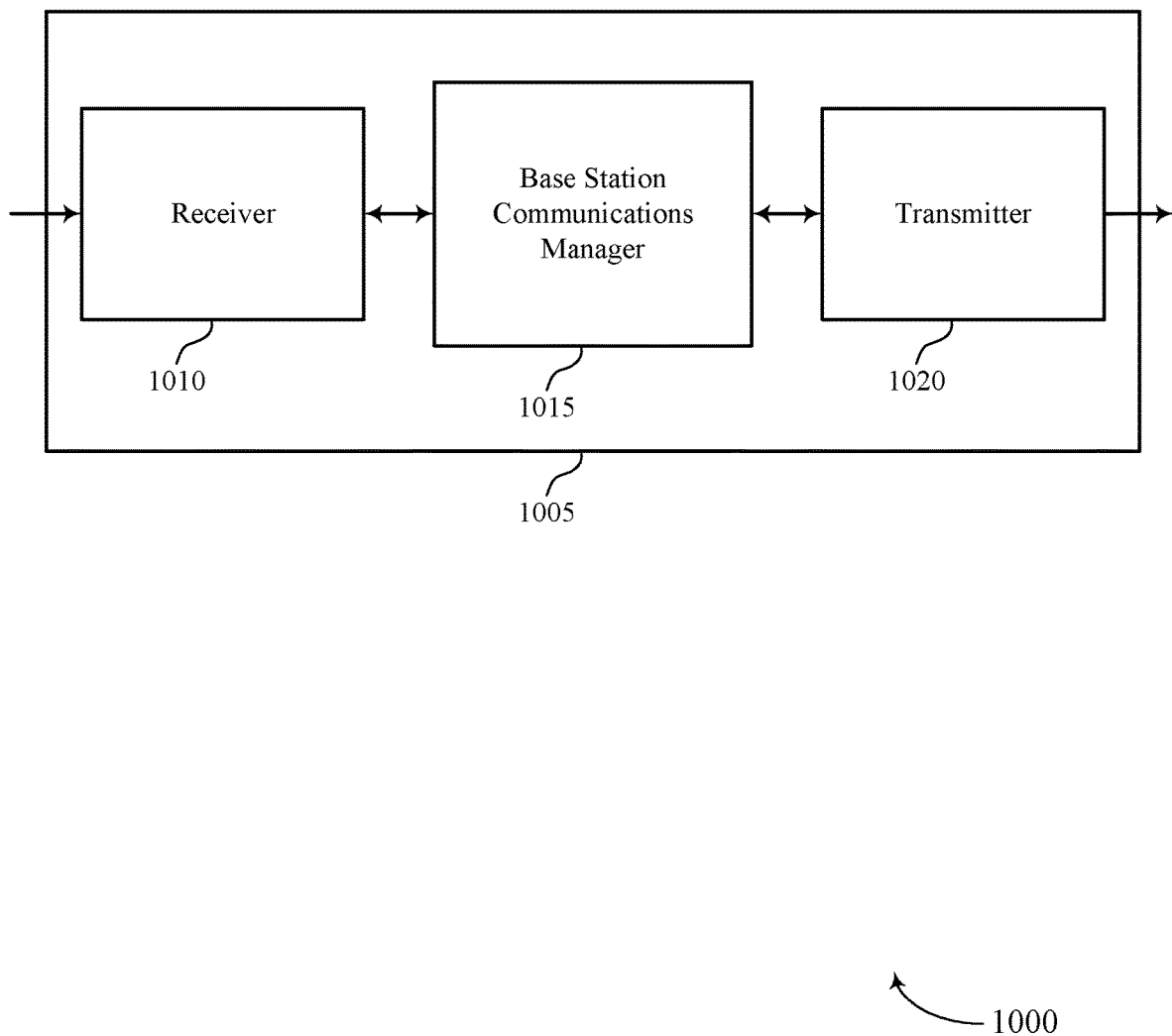
FIGS. 10 through 12 show block diagrams of a device that supports shortened transmission time interval configuration based on user equipment capabilities in accordance with aspects of the present disclosure.

FIG. 10 shows a block diagram 1000 of a wireless device 1005 that supports shortened transmission time interval configuration based on user equipment capabilities in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to shortened transmission time interval configuration based on user equipment capabilities, etc.). Information may be passed on to other components of the device. Receiver 1010 may be an example of aspects of transceiver 1335 described with reference to FIG. 13. Receiver 1010 may utilize a single antenna or a set of antennas.

Base station communications manager 1015 may be an example of aspects of base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may receive an indicator representing a capability of the UE 115 to process transmissions having a first TTI duration and a second TTI duration for each of one or more supported bands or band combinations, the first TTI duration being shorter than the second TTI duration, schedule a component carrier within a frequency band of a first supported band or band combination of the one or more supported bands or band combinations based at least in part on the received indicator, and transmit information within the frequency band of the component carrier based at least in part on the scheduling.

Transmitter 1020 may transmit signals generated by other components of the device. In some examples, transmitter 1020 may be collocated with receiver 1010 in a transceiver module. For example, transmitter 1020 may be an example of aspects of transceiver 1335 described with reference to FIG. 13. Transmitter 1020 may utilize a single antenna or a set of antennas.

Figure 11:
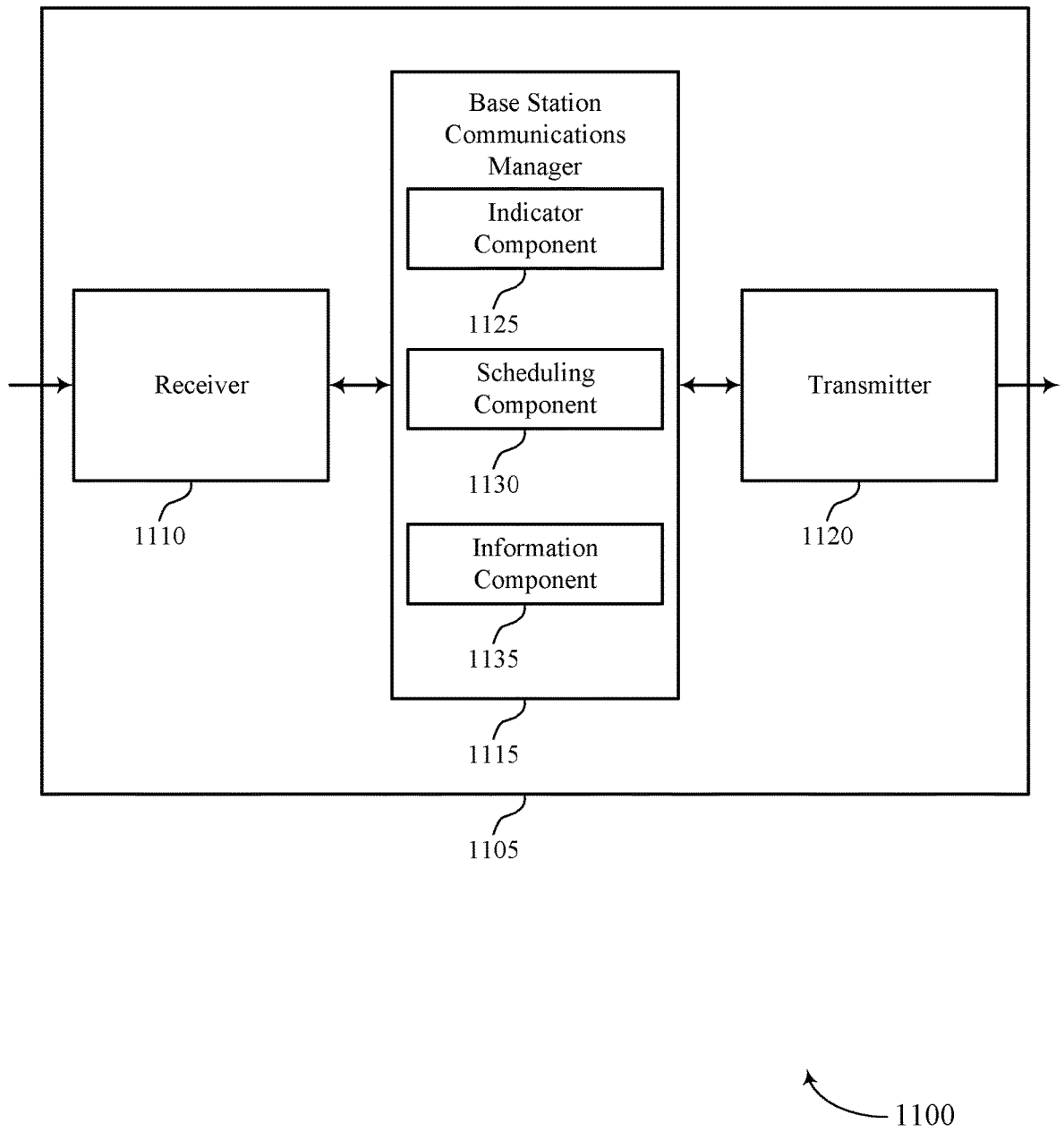

FIG. 11 shows a block diagram 1100 of a wireless device 1105 that supports shortened transmission time interval configuration based on user equipment capabilities in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to shortened transmission time interval configuration based on user equipment capabilities, etc.). Information may be passed on to other components of the device. Receiver 1110 may be an example of aspects of transceiver 1335 described with reference to FIG. 13. Receiver 1110 may utilize a single antenna or a set of antennas.

Base station communications manager 1115 may be an example of aspects of base station communications manager 1315 described with reference to FIG. 13.

Base station communications manager 1115 may also include indicator component 1125, scheduling component 1130, and information component 1135.

Indicator component 1125 may receive an indicator representing a capability of the UE 115 to process transmissions having a first TTI duration and a second TTI duration for each of one or more supported bands or band combinations, the first TTI duration being shorter than the second TTI duration, process the indicator to determine a first number of component carriers (CCs) within the frequency band that the UE 115 is configured to support, and process the indicator to determine a relationship between a number of component carriers that the UE 115 supports for the first TTI duration and the second TTI duration, where scheduling the component carrier is based on the relationship.

Scheduling component 1130 may schedule a component carrier within a frequency band of a first supported band or band combination of the one or more supported bands or band combinations based at least in part on the received indicator. In some cases, scheduling component 1130 may schedule a second number of CCs for the UE 115 within the frequency band, where the second number of CCs exceeds the first number of CCs.

Information component 1135 may transmit information within the frequency band of the component carrier based at least in part on the scheduling. In some cases, transmitting the information within the frequency band of the component carrier includes: transmitting first information in a first TTI duration and second information in a second TTI duration.

Transmitter 1120 may transmit signals generated by other components of the device. In some examples, transmitter 1120 may be collocated with receiver 1110 in a transceiver module. For example, transmitter 1120 may be an example of aspects of transceiver 1335 described with reference to FIG. 13. Transmitter 1120 may utilize a single antenna or a set of antennas.

Figure 12:
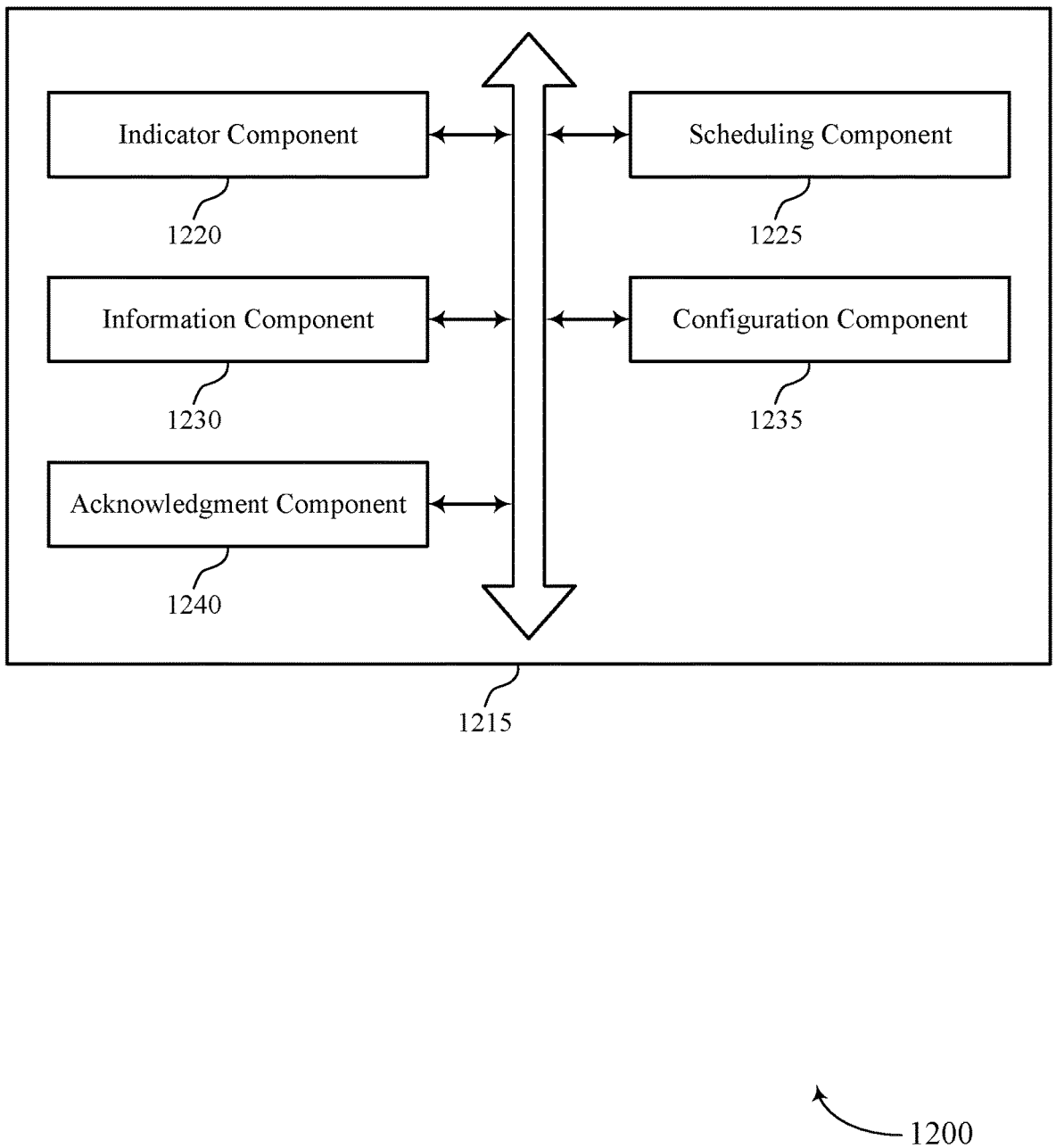

FIG. 12 shows a block diagram 1200 of base station communications manager 1215 that supports shortened transmission time interval configuration based on user equipment capabilities in accordance with aspects of the present disclosure. Base station communications manager 1215 may be an example of aspects of a base station communications manager 1315 described with reference to FIGS. 10, 11, and 13. Base station communications manager 1215 may include indicator component 1220, scheduling component 1225, information component 1230, configuration component 1235, and acknowledgment component 1240. Each of these modules may communicate, directly or indirectly, with one another (e.g., via one or more buses).

Indicator component 1220 may receive an indicator representing a capability of the UE 115 to process transmissions having a first TTI duration and a second TTI duration for each of one or more supported bands or band combinations, the first TTI duration being shorter than the second TTI duration, process the indicator to determine a first number of component carriers (CCs) within the frequency band that the UE 115 is configured to support, and process the indicator to determine a relationship between a number of component carriers that the UE 115 supports for the first TTI duration and the second TTI duration, where scheduling the component carrier is based on the relationship.

Scheduling component 1225 may schedule a component carrier within a frequency band of a first supported band or band combination of the one or more supported bands or band combinations based at least in part on the received indicator. In some cases, scheduling component 1225 may schedule a second number of CCs for the UE 115 within the frequency band, where the second number of CCs exceeds the first number of CCs.

Information component 1230 may transmit information within the frequency band of the component carrier based at least in part on the scheduling. In some cases, transmitting the information within the frequency band of the component carrier includes: transmitting first information in a first TTI duration and second information in a second TTI duration.

Configuration component 1235 may configure the UE 115 with a second number of CCs, wherein the second number of CCs exceeds a maximum number of CCs specified in the indicator that the UE 115 is configured to support.

Acknowledgment component 1240 may receive a first acknowledgement message for the first information based on an acknowledgement timeline for the first TTI duration and a second acknowledgement message for the second information based on an acknowledgement timeline for the second TTI duration.

Figure 13:
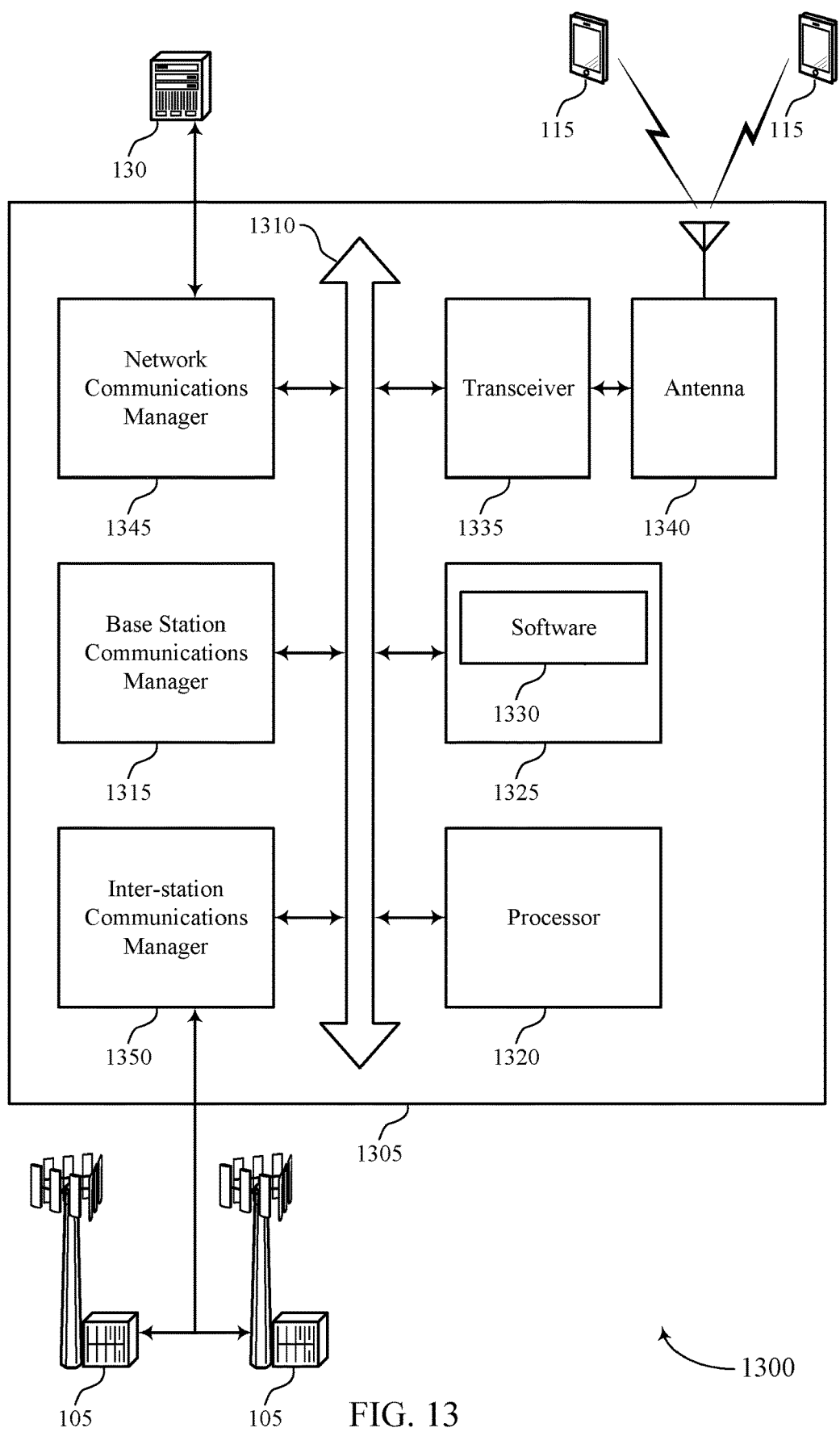
FIG. 13 illustrates a block diagram of a system including a base station that supports shortened transmission time interval configuration based on user equipment capabilities in accordance with aspects of the present disclosure.

FIG. 13 shows a diagram of a system 1300 including a device 1305 that supports shortened transmission time interval configuration based on user equipment capabilities in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting shortened transmission time interval configuration based on user equipment capabilities).

Memory 1325 may include RAM and ROM. Memory 1325 may store computer-readable, computer-executable software 1330 including instructions that, when executed, cause the processor to perform various functions described herein. In some cases, memory 1325 may contain, among other things, a BIOS which may control basic hardware or software operation such as the interaction with peripheral components or devices.

Software 1330 may include code to implement aspects of the present disclosure, including code to support shortened transmission time interval configuration based on user equipment capabilities. Software 1330 may be stored in a non-transitory computer-readable medium such as system memory or other memory. In some cases, software 1330 may not be directly executable by the processor 1320 but may cause a computer (e.g., when compiled and executed) to perform functions described herein.

Transceiver 1335 may communicate bi-directionally, via one or more antennas, wired, or wireless links as described above. For example, transceiver 1335 may represent a wireless transceiver and may communicate bi-directionally with another wireless transceiver. Transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
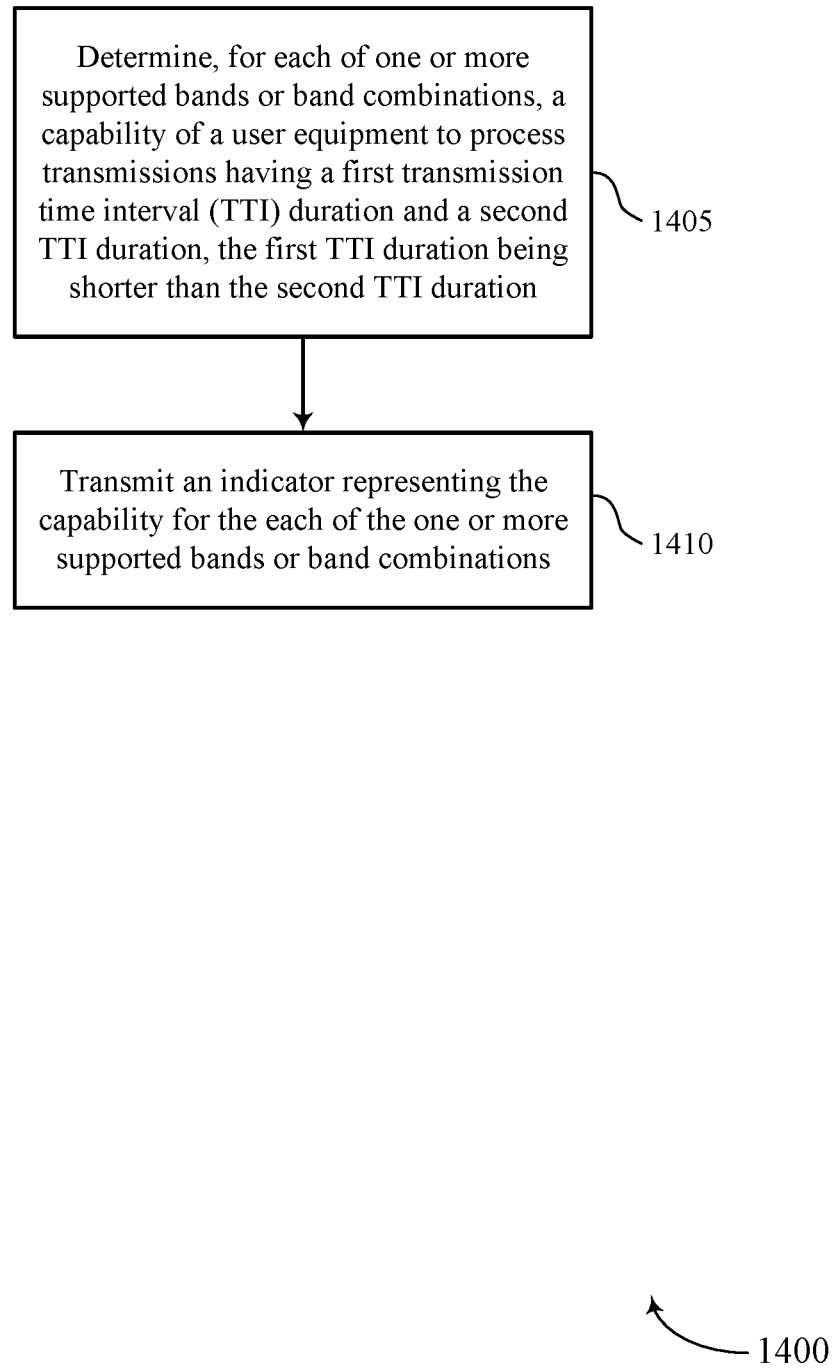
FIGS. 14 through 17 illustrate methods for shortened transmission time interval configuration based on user equipment capabilities in accordance with aspects of the present disclosure.

FIG. 14 shows a flowchart illustrating a method 1400 for shortened transmission time interval configuration based on user equipment capabilities in accordance with aspects of the present disclosure. The operations of method 1400 may be implemented by a UE 115 or its components as described herein. For example, the operations of method 1400 may be performed by UE communications manager 615, 715, 815, and 915 as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may determine, for each of one or more supported bands or band combinations, a capability of the UE 115 to process transmissions having a first TTI duration and a second TTI duration, the first TTI duration being shorter than the second TTI duration. The operations of block 1405 may be performed according to the methods described herein. In certain examples, aspects of the operations of block 1405 may be performed by capability component 615, 725, 820, and 915 as described with reference to FIGS. 6 through 9.

At block 1410, the UE 115 may transmit, to a base station, an indicator representing the capability for the each of the one or more supported bands or band combinations. The operations of block 1410 may be performed according to the methods described herein. In certain examples, aspects of the operations of block 1410 may be performed by indicator component 615, 730, 825, and 915 as described with reference to FIGS. 6 through 9.

Figure 15:
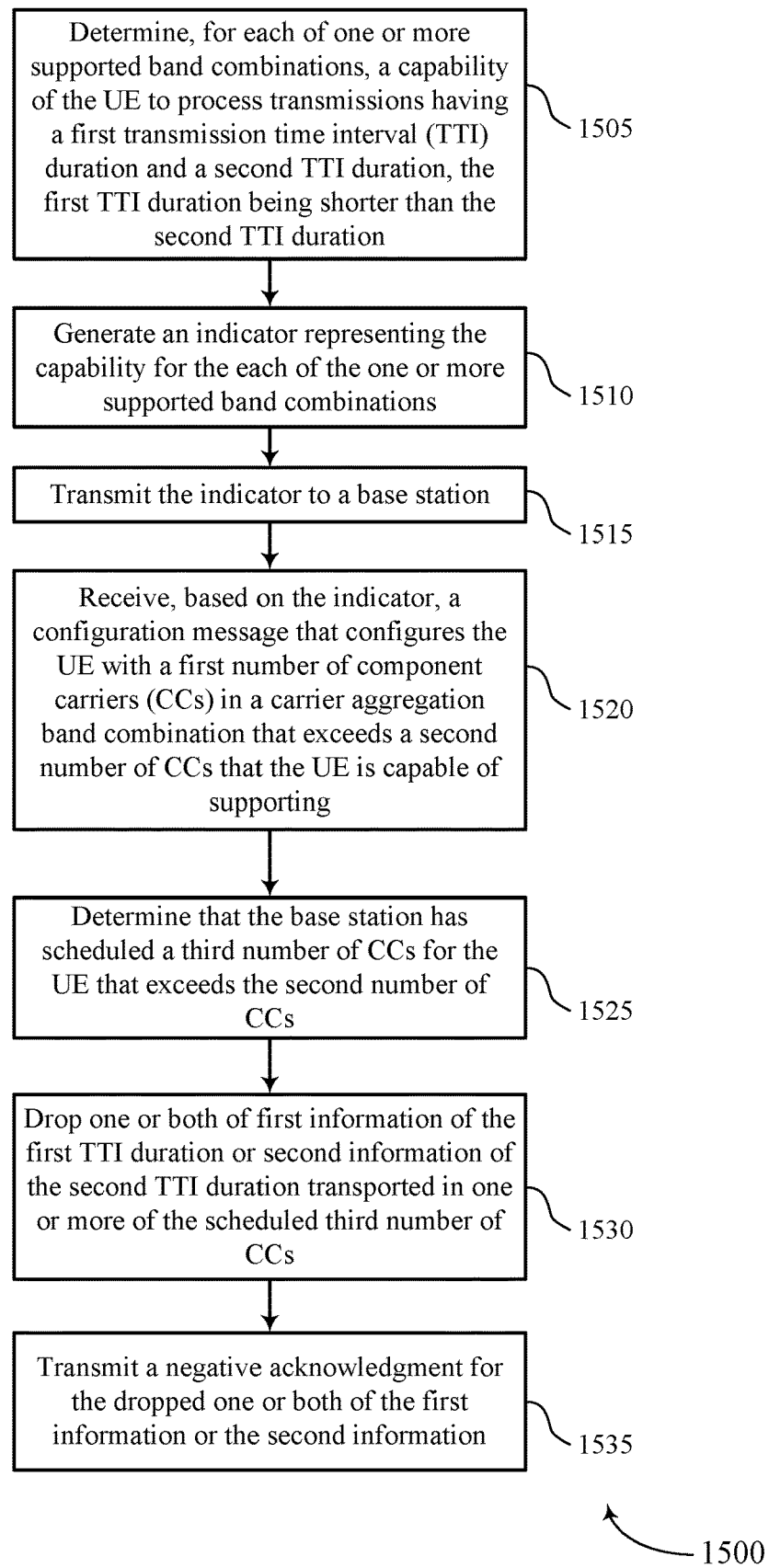

FIG. 15 shows a flowchart illustrating a method 1500 for shortened transmission time interval configuration based on user equipment capabilities in accordance with aspects of the present disclosure. The operations of method 1500 may be implemented by a UE 115 or its components as described herein. For example, the operations of method 1500 may be performed by a UE communications manager 615, 715, 815, and 915 as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may determine, for each of one or more supported bands or band combinations, a capability of the UE 115 to process transmissions having a first TTI duration and a second TTI duration, the first TTI duration being shorter than the second TTI duration. The operations of block 1505 may be performed according to the methods described herein. In certain examples, aspects of the operations of block 1505 may be performed by a capability component 615, 725, 820, and 915 as described with reference to FIGS. 6 through 9.

At block 1510 the UE 115 may generate an indicator representing the capability for the each of the one or more supported band combinations. The operations of block 1510 may be performed according to the methods described herein. In certain examples, aspects of the operations of block 1510 may be performed by an indicator component 615, 730, 825, and 915 as described with reference to FIGS. 6 through 9.

At block 1515 the UE 115 may transmit the indicator to a base station. The operations of block 1515 may be performed according to the methods described herein. In certain examples, aspects of the operations of block 1515 may be performed by an indicator component 615, 730, 825, and 915 as described with reference to FIGS. 6 through 9.

At block 1520 the UE 115 may receive, based at least in part on the indicator, a configuration message that configures the UE with a first number of component carriers (CCs) in a carrier aggregation band combination that exceeds a second number of CCs that the UE is capable of supporting. The operations of block 1520 may be performed according to the methods described herein. In certain examples, aspects of the operations of block 1520 may be performed by a configuration component 615, 715, 865, and 915 as described with reference to FIGS. 6 through 9.

At block 1525 the UE 115 may determine that the base station has scheduled a third number of CCs for the UE that exceeds the second number of CCs. The operations of block 1525 may be performed according to the methods described herein. In certain examples, aspects of the operations of block 1525 may be performed by a scheduling component 615, 715, 870, and 915 as described with reference to FIGS. 6 through 9.

At block 1530 the UE 115 may drop one or both of first information of the first TTI duration or second information of the second TTI duration transported in one or more of the scheduled third number of CCs. The operations of block 1530 may be performed according to the methods described herein. In certain examples, aspects of the operations of block 1530 may be performed by a discard component 615, 715, 860, and 915 as described with reference to FIGS. 6 through 9.

At block 1535 the UE 115 may transmit a negative acknowledgment for the dropped one or both of the first information or the second information. The operations of block 1535 may be performed according to the methods described herein. In certain examples, aspects of the operations of block 1535 may be performed by an acknowledgment component 615, 715, 875, and 915 as described with reference to FIGS. 6 through 9.

Figure 16:
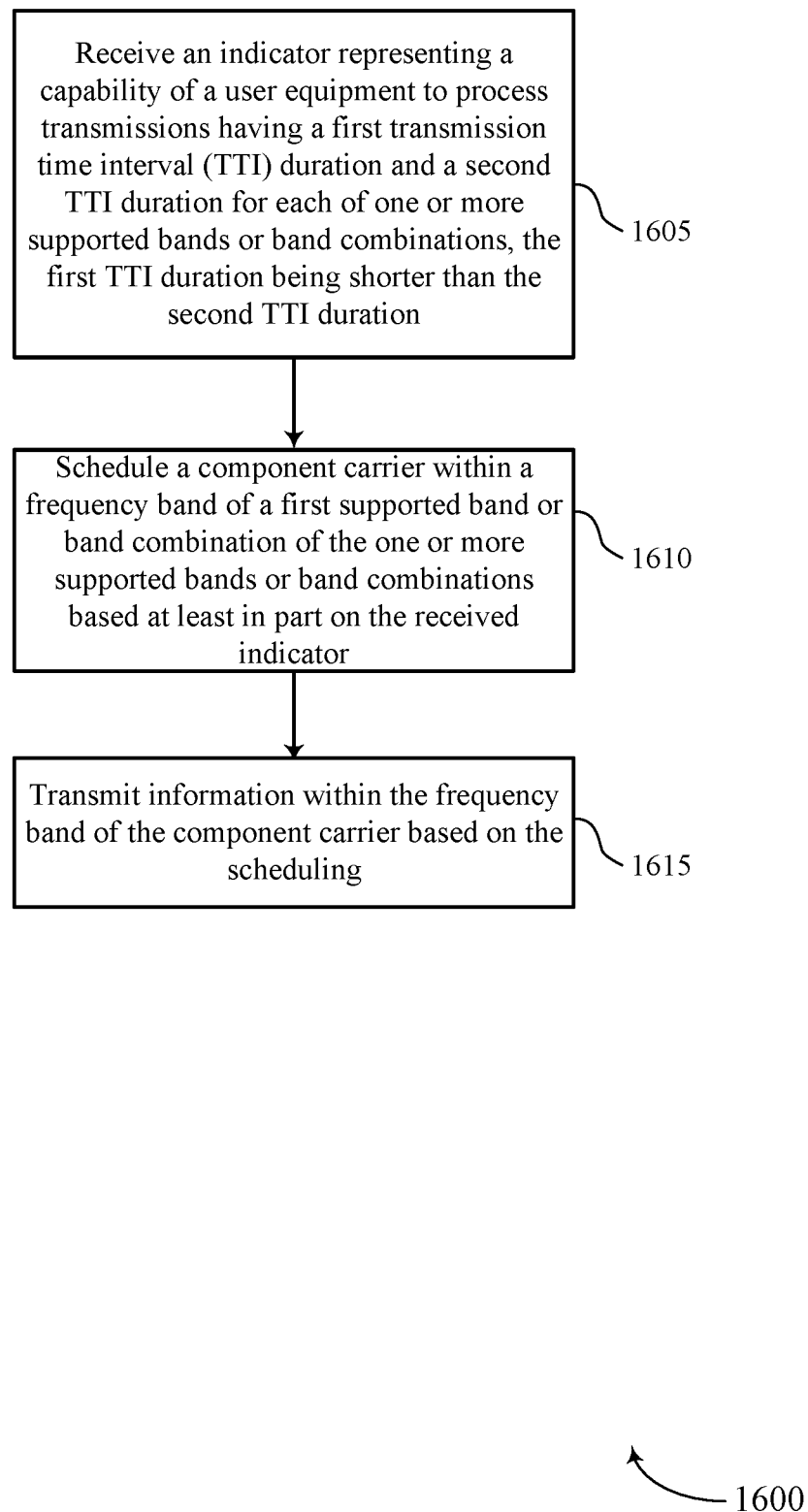

FIG. 16 shows a flowchart illustrating a method 1600 for shortened transmission time interval configuration based on user equipment capabilities in accordance with aspects of the present disclosure. The operations of method 1600 may be implemented by a base station 105 or its components as described herein. For example, the operations of method 1600 may be performed by base station communications manager 1015, 1115, 1215, and 1315 as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1605, the base station 105 may receive an indicator representing a capability of the UE 115 to process transmissions having a first TTI duration and a second TTI duration for each of one or more supported bands or band combinations, the first TTI duration being shorter than the second TTI duration. The operations of block 1605 may be performed according to the methods described herein. In certain examples, aspects of the operations of block 1605 may be performed by indicator component 1015, 1125, 1220, and 1315 as described with reference to FIGS. 10 through 13.

At block 1610, the base station 105 may schedule a component carrier within a frequency band of a first supported band or band combination of the one or more supported bands or band combinations based at least in part on the received indicator. The operations of block 1610 may be performed according to the methods described herein. In certain examples, aspects of the operations of block 1610 may be performed by scheduling component 1015, 1130, 1225, and 1315 as described with reference to FIGS. 10 through 13.

At block 1615, the base station 105 may transmit information within the frequency band of the component carrier based at least in part on the scheduling. The operations of block 1615 may be performed according to the methods described herein. In certain examples, aspects of the operations of block 1615 may be performed by an information component as described with reference to FIGS. 10 through 13.

Figure 17:
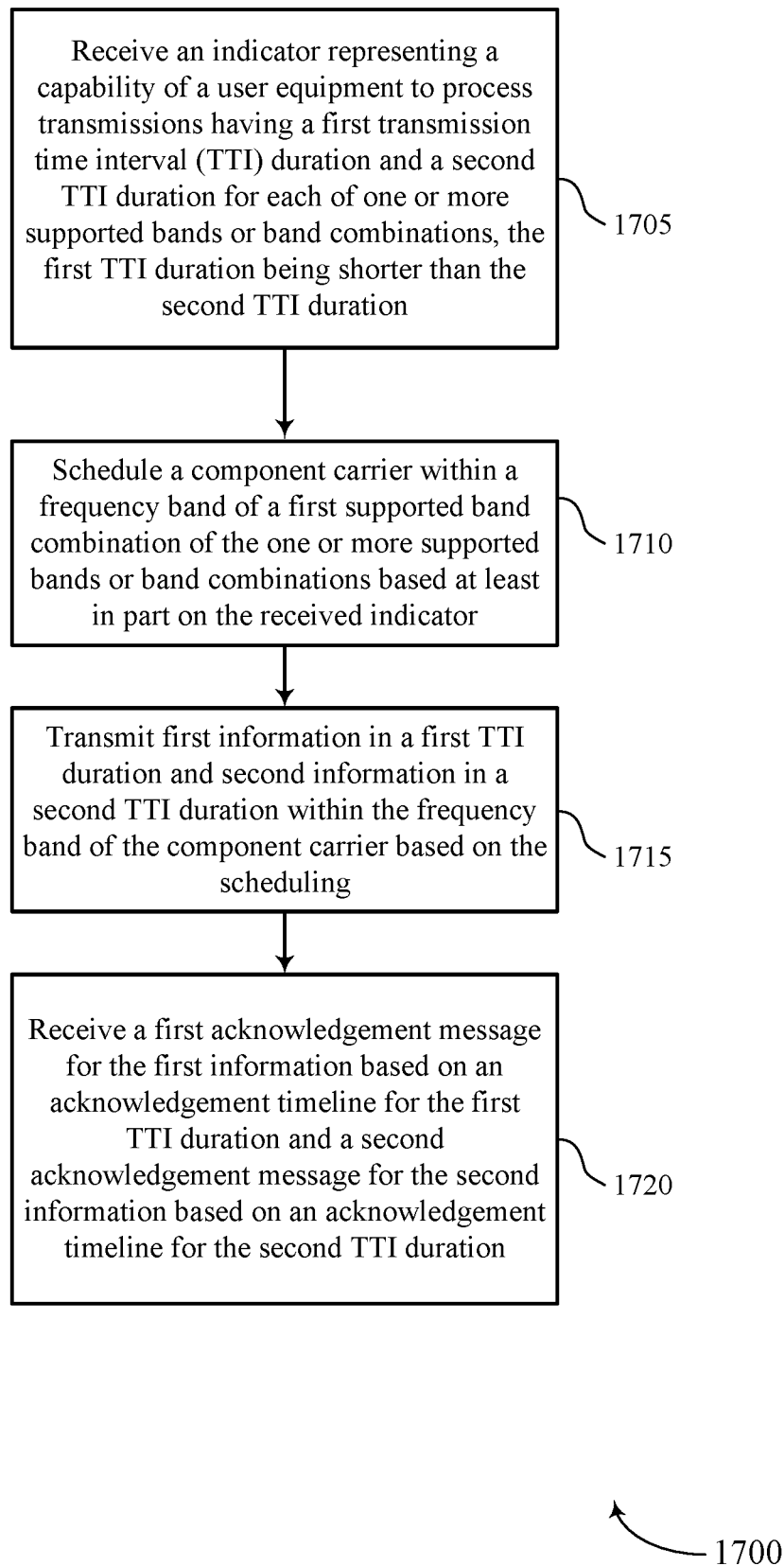

FIG. 17 shows a flowchart illustrating a method 1700 for shortened transmission time interval configuration based on user equipment capabilities in accordance with aspects of the present disclosure. The operations of method 1700 may be implemented by a base station 105 or its components as described herein. For example, the operations of method 1700 may be performed by base station communications manager 1015, 1115, 1215, and 1315 as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705, the base station 105 may receive an indicator representing a capability of a UE to simultaneously process transmissions in a first TTI duration and a second TTI duration within a frequency band of a component carrier, the first TTI duration having a duration that is less than the second TTI duration. The operations of block 1705 may be performed according to the methods described herein. In certain examples, aspects of the operations of block 1705 may be performed by indicator component 1015, 1125, 1220, and 1315 as described with reference to FIGS. 10 through 13.

At block 1710, the base station 105 may schedule the component carrier based at least in part on the received indicator. The operations of block 1710 may be performed according to the methods described herein. In certain examples, aspects of the operations of block 1710 may be performed by scheduling component 1015, 1130, 1225, and 1315 as described with reference to FIGS. 10 through 13.

At block 1715, the base station 105 may transmit first information in a first TTI duration and second information in a second TTI duration within the frequency band of the component carrier based at least in part on the scheduling. The operations of block 1715 may be performed according to the methods described herein. In certain examples, aspects of the operations of block 1715 may be performed by information component 1015, 1135, 1230, and 1315 as described with reference to FIGS. 10 through 13.

At block 1720, the base station 105 may receive a first acknowledgement message for the first information based at least in part on an acknowledgement timeline for the first TTI duration and a second acknowledgement message for the second information based at least in part on an acknowledgement timeline for the second TTI duration. The operations of block 1720 may be performed according to the methods described herein. In certain examples, aspects of the operations of block 1720 may be performed by acknowledgment component 1015, 1115, 1240, and 1315 as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   determining, for each of a plurality of supported bands or band combinations, a feedback processing timing capability of the UE to process transmissions having a first transmission time interval (TTI) duration according to a first feedback processing timeline and a second TTI duration according to a second feedback processing timeline, the first TTI duration being shorter than the second TTI duration; and
   transmitting, to a base station, an indicator representing the feedback processing timing capability for the each of the plurality of supported bands or band combinations and whether the UE is capable of simultaneously processing the first TTI duration and the second TTI duration in each supported band or band combination of the plurality of supported bands or band combinations, wherein the indicator comprises a value pair indicating a supported downlink TTI duration and a supported uplink TTI duration for a first supported band or band combination of the plurality of supported bands or band combinations.

2. The method of claim 1, wherein the indicator further indicates a constraint on the feedback processing timing capability when the UE operates in a respective band of the plurality of supported bands or band combinations.

3. The method of claim 2, wherein the constraint comprises a processing constraint of the UE for the respective band of the plurality of supported bands or band combinations.

4. The method of claim 3, wherein the processing constraint is a discard window depth.

5. The method of claim 4, wherein the discard window depth comprises an uplink discard window depth for uplink transmissions and a downlink discard window depth for downlink transmissions.

6. The method of claim 3, wherein the processing constraint is associated with Enhanced Physical Downlink Control Channel (ePDCCH) based scheduling, or DeModulation Reference Signal (DMRS) based transmission modes (TMs), or both.

7. The method of claim 1, further comprising:
   determining that the UE is capable of simultaneously processing transmissions in the first TTI duration and the second TTI duration while operating in a respective band of the plurality of supported bands or band combinations, wherein the indicator represents that the UE is capable of simultaneously processing transmissions in accordance with the first feedback processing timeline for the first TTI duration and in accordance with the second feedback processing timeline the second TTI duration.

8. The method of claim 7, further comprising:
   determining that the UE is capable of simultaneously processing transmissions having a third TTI duration that differs from one or both of the first TTI duration and the second TTI duration while operating in a respective band of the plurality of supported bands or band combinations, wherein the indicator represents that the UE is capable of simultaneously processing transmissions in accordance with a third feedback processing timeline for the third TTI duration.

9. The method of claim 1, wherein transmitting the indicator further comprises:
   transmitting the feedback processing timing capability of the UE to process transmissions having a third TTI duration that differs from one or both of the first TTI duration and the second TTI duration.

10. The method of claim 1, wherein transmitting the indicator further comprises:
    transmitting an uplink indicator that indicates an uplink capability of the UE to support uplink transmissions having the first TTI duration or the second TTI duration.

11. The method of claim 10, wherein the uplink indicator indicates a defined number of uplink component carriers supported by the UE for uplink transmissions having the first TTI duration or the second TTI duration.

12. The method of claim 1, further comprising:
    receiving a configuration message that indicates a plurality of transmission configurations, wherein the indicator indicates a number of component carriers supported by the UE per transmission configuration of the plurality of transmission configurations.

13. The method of claim 1, wherein the indicator indicates a defined number of downlink component carriers supported by the UE for downlink transmissions having the first TTI duration or the second TTI duration.

14. The method of claim 1, wherein the indicator indicates an uplink capability of the UE to support uplink transmissions having the first TTI duration or the second TTI duration and a downlink capability of the UE to support downlink transmissions having the first TTI duration or the second TTI duration.

15. The method of claim 14, wherein the uplink capability differs from the downlink capability.

16. The method of claim 1, further comprising:
receiving, based at least in part on the indicator, a configuration message indicating a first number of component carriers in the first supported band or band combination of the plurality of supported bands or band combinations.

17. The method of claim 16, wherein the first number of component carriers exceeds a defined number of component carriers supported by the UE for uplink or downlink transmissions having the first TTI duration.

18. The method of claim 1, wherein the indicator indicates the feedback processing timing capability of the UE to process transmissions having the first TTI duration or the second TTI duration in at least one band of a first band combination of the plurality of supported bands or band combinations.

19. The method of claim 1, wherein the indicator is based at least in part on the first feedback processing timeline for the first TTI duration, the second feedback processing timeline for the second TTI duration, or both.

20. The method of claim 1, wherein the indicator indicates the feedback processing timing capability of the UE to support transmissions having the first TTI duration and the second TTI duration on a respective band of the plurality of supported bands or band combinations.

21. The method of claim 1, further comprising:
determining a number of spatial layers that the UE is capable of supporting per component carrier or per band in the each of the plurality of supported bands or band combinations, wherein the indicator is generated based at least in part on the determined number of spatial layers.

22. The method of claim 21, further comprising:
determining that the UE is capable of supporting a first number of spatial layers per component carrier or per band in a first supported band or band combination of the plurality of supported bands or band combinations, wherein the indicator indicates that the UE is capable of supporting a second number of spatial layers that is less than the first number of spatial layers in the first supported band or band combination.

23. The method of claim 1, further comprising:
processing first information of the first TTI duration and second information of the second TTI duration in accordance with the feedback processing timing capability.

24. The method of claim 23, wherein the indicator indicates a discard window depth that identifies a depth at which the UE discards the second information received in plurality of instances of the second TTI duration prior to the first TTI duration, wherein the indicator indicates the discard window depth.

25. The method of claim 24, wherein the indicator indicates an uplink discard window depth for uplink transmissions and a downlink discard window depth for downlink transmissions.

26. The method of claim 25, wherein the indicator indicates the uplink discard window depth in accordance with a first timeline and the downlink discard window depth in accordance with a second timeline.

27. The method of claim 23, further comprising:
determining a sum of a maximum transport block size (TBS) and/or number of resource blocks of the second information within a processing window and a TBS and/or number of resource blocks of the first information within the processing window; and
comparing the sum to a threshold.

28. The method of claim 27, wherein comparing the sum to the threshold comprises:
determining that the sum does not satisfy the threshold; and
discarding at least some of the second information received in one or more instances of the second TTI duration.

29. The method of claim 27, wherein comparing the sum to the threshold comprises:
determining that the sum satisfies the threshold; and
processing the first information and the second information received in one or more instances of the second TTI duration.

30. The method of claim 1, wherein:
the indicator indicates that the UE is not capable of processing the first TTI duration in the first supported band or band combination of the plurality of supported bands or band combinations.

31. The method of claim 1, wherein:
the indicator indicates a capability of the UE to process the first TTI duration in a respective band of the plurality of supported bands or band combinations.

32. The method of claim 1, wherein:
the indicator comprises an uplink indicator that indicates a capability of the UE to process an uplink instance of the first TTI duration in the first supported band or band combination of the plurality of supported bands or band combinations and a downlink indicator that indicates a capability of the UE to process a downlink instance of the first TTI duration in the first supported band or band combination.

33. The method of claim 1, wherein:
the indicator indicates a capability of the UE to process a first instance of the first TTI duration having a first length in the first supported band or band combination of the plurality of supported bands or band combinations and a capability of the UE to process a second instance of the first TTI duration having a second length in the first supported band or band combination.

34. The method of claim 1, further comprising:
receiving, based at least in part on the indicator, a configuration message that configures the UE with a first number of component carriers in the first supported band or band combination of the plurality of supported bands or band combinations that exceeds a second number of component carriers that the UE is capable of supporting.

35. The method of claim 34, further comprising:
determining that the base station has scheduled a third number of component carriers for the UE that exceeds the second number of component carriers; and dropping one or both of first information of the first TTI duration or second information of the second TTI duration transported in one or more of the scheduled third number of component carriers.

36. The method of claim 35, further comprising:
transmitting a negative acknowledgment for the dropped one or both of the first information or the second information.

37. The method of claim 1, further comprising:
determining that processing durations of first information of the first TTI duration and second information of the second TTI duration are overlapping; and
transmitting a first acknowledgement message for the first information based at least in part on the first feedback processing timeline for the first TTI duration and a second acknowledgement message for the second information based at least in part on the second feedback processing timeline for the second TTI duration.

38. The method of claim 1, wherein transmitting the indicator comprises:
determining a relationship between a number of component carriers that the UE supports for the first TTI duration and the second TTI duration, wherein the indicator indicates the relationship.

39. The method of claim 1, wherein:
the indicator indicates support for Enhanced Physical Downlink Control Channel (ePDCCH) based scheduling for the first supported band or band combination of the plurality of supported bands or band combinations.

40. The method of claim 1, wherein:
the indicator indicates support for DeModulation Reference Signal (DMRS) based transmission modes (TMs) for a first supported band or band combination of the plurality of supported bands or band combinations.

41. The method of claim 1, wherein:
each of the plurality of supported bands or band combinations are carrier aggregation band combinations.

42. The method of claim 1, wherein the transmissions comprise at least an uplink transmission, a downlink transmission, or both.

43. The method of claim 1, wherein transmitting the indicator further comprises:
transmitting the indicator that indicates a downlink capability of the UE to support downlink transmissions having the first TTI duration or the second TTI duration.

44. A method for wireless communication at a base station, comprising:
receiving an indicator representing a feedback processing timing capability of a user equipment (UE) to simultaneously process transmissions having a first transmission time interval (TTI) duration according to a first feedback processing timeline and a second TTI duration according to a second feedback processing timeline for each of a plurality of supported bands or band combinations, the first TTI duration being shorter than the second TTI duration;
scheduling a component carrier within a frequency band of each supported band or band combination of the plurality of supported bands or band combinations based at least in part on the received indicator, wherein the indicator comprises a value pair indicating a supported downlink TTI duration and a supported uplink TTI duration for a first supported band or band combination of the plurality of supported bands or band combinations; and
transmitting information within the frequency band of the component carrier based at least in part on the scheduling.

45. The method of claim 44, wherein receiving the indicator further comprises:
receiving an uplink indicator that indicates an uplink capability of the UE to support uplink transmissions having the first TTI duration or the second TTI duration, wherein the uplink indicator indicates a defined number of uplink component carriers supported by the UE for uplink transmissions having the first TTI duration or the second TTI duration.

46. The method of claim 44,
wherein the indicator indicates a defined number of downlink component carriers supported by the UE for downlink transmissions having the first TTI duration or the second TTI duration.

47. The method of claim 44, wherein the indicator is based at least in part on the first feedback processing timeline for the first TTI duration, the second feedback processing timeline for the second TTI duration, or both.

48. The method of claim 44, wherein the indicator indicates a discard window depth for identifying a depth at which the UE discards second information received in one or more instances of the second TTI duration prior to the first TTI duration.

49. The method of claim 48, wherein the indicator indicates an uplink discard window depth for uplink transmissions and a downlink discard window depth for downlink transmissions.

50. The method of claim 44, wherein the indicator indicates that the UE is capable of simultaneously processing transmissions in the first TTI duration and the second TTI duration while operating in a respective band of the plurality of supported bands or band combinations, wherein the indicator represents that the UE is capable of simultaneously processing transmissions in accordance with the first feedback processing timeline for the first TTI duration and in accordance with the second feedback processing timeline for the second TTI duration.

51. The method of claim 44, further comprising:
processing the indicator to determine a relationship between a number of component carriers that the UE supports for the first TTI duration and the second TTI duration, wherein scheduling the component carrier is based at least in part on the relationship.

52. An apparatus for wireless communication, comprising:
a processor;
memory coupled to the processor; and
instructions stored in the memory and operable, when executed by the processor, to cause the apparatus to:
determine, for each of a plurality of supported bands or band combinations, a feedback processing timing capability of a user equipment (UE) to process transmissions having a first transmission time interval (TTI) duration according to a first feedback processing timeline and a second TTI duration according to a second feedback processing timeline, the first TTI duration being shorter than the second TTI duration; and
transmit an indicator representing the feedback processing timing capability for the each of the plurality of supported bands or band combinations and whether the UE is capable of simultaneously processing the first TTI duration and the second TTI duration in each supported band or band combination of the plurality of supported bands or band combinations, wherein the indicator comprises a value pair indicating a supported downlink TTI duration and a supported uplink TTI duration for a first supported band or band combination of the plurality of supported bands or band combinations.

53. The apparatus of claim 52, wherein the instructions to transmit the indicator are further executable to:
transmit an uplink indicator that indicates a defined number of uplink component carriers supported by the UE for uplink transmissions having the first TTI duration.

54. The apparatus of claim 52, wherein the instructions to transmit the indicator are further executable to:
transmit a downlink indicator that indicates a defined number of downlink component carriers supported by the UE for downlink transmissions having the first TTI duration.

55. The apparatus of claim 52, wherein the indicator further indicates a constraint on the feedback processing timing capability when the UE operates in each of the plurality of supported bands or band combinations.

56. The apparatus of claim 55, wherein the constraint comprises a processing constraint of the UE.

57. The apparatus of claim 56, wherein the processing constraint is a discard window depth associated with a maximum transport block size, a maximum number of resource blocks, or both.

58. The apparatus of claim 56, wherein the processing constraint is associated with Enhanced Physical Downlink Control Channel (ePDCCH) based scheduling, or DeModulation Reference Signal (DMRS) based transmission modes (TMs), or both.

59. The apparatus of claim 52, wherein the instructions are further executable by the processor to:
determine that the UE is capable of simultaneously processing transmissions in the first TTI duration and the second TTI duration while operating in each of the plurality of supported bands or band combinations, wherein the indicator represents that the UE is capable of simultaneously processing transmissions in accordance with the first feedback processing timeline for the first TTI duration and in accordance with the second feedback processing timeline for the second TTI duration.

60. The apparatus of claim 52, wherein the instructions are further executable by the processor to:
determine a number of spatial layers that the UE is capable of supporting per component carrier or per band in each of the plurality of supported bands or band combinations, wherein the indicator is generated based at least in part on the determined number of spatial layers.

61. The apparatus of claim 52, wherein:
the indicator indicates at least one of that the UE is capable of simultaneously processing the first TTI duration and the second TTI duration in the first supported band or band combination of the plurality of supported bands or band combinations, that the UE is not capable of processing the first TTI duration in the first supported band or band combination of the plurality of supported bands or band combinations, or that the UE is capable of processing the first TTI duration in each of the plurality of supported bands or band combinations.

62. The apparatus of claim 52, wherein:
the indicator comprises an uplink indicator that indicates a capability of the UE to process an uplink instance of the first TTI duration in the first supported band or band combination of the plurality of supported bands or band combinations and a downlink indicator that indicates a capability of the UE to process a downlink instance of the first TTI duration in the first supported band or band combination.

63. An apparatus for wireless communication, comprising:
a processor;
memory coupled to the processor; and
instructions stored in the memory and operable, when executed by the processor, to cause the apparatus to:
receive an indicator representing a feedback processing timing capability of a user equipment (UE) to simultaneously process transmissions having a first transmission time interval (TTI) duration according to a first feedback processing timeline and a second TTI duration according to a second feedback processing timeline for each of a plurality of supported bands or band combinations, the first TTI duration being shorter than the second TTI duration;
schedule a component carrier within a frequency band of each supported band or band combination of the plurality of supported bands or band combinations based at least in part on the received indicator, wherein the indicator comprises a value pair indicating a supported downlink TTI duration and a supported uplink TTI duration for a first supported band or band combination of the plurality of supported bands or band combinations; and
transmit information within the frequency band of the component carrier based at least in part on the scheduling.

64. The apparatus of claim 63, wherein the instructions to receive the indicator are further executable by the processor to:
receive an uplink indicator that indicates a defined number of uplink component carriers supported by the UE for uplink transmissions having the first TTI duration.

65. The apparatus of claim 64, wherein the
indicator indicates a defined number of downlink component carriers supported by the UE for downlink transmissions having the first TTI duration.

* * * * *